United States Patent
Hosono

(10) Patent No.: US 9,654,695 B2
(45) Date of Patent: May 16, 2017

(54) IMAGING DEVICE AND CONTROL METHOD FOR IMAGING DEVICE

(71) Applicant: Olympus Corporation, Hachioji-shi, Tokyo (JP)

(72) Inventor: Kazuya Hosono, Chofu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/098,777

(22) Filed: Apr. 14, 2016

(65) Prior Publication Data

US 2016/0234444 A1   Aug. 11, 2016

Related U.S. Application Data

(63) Continuation of application No. PCT/JP2015/005039, filed on Mar. 25, 2015.

(30) Foreign Application Priority Data

Nov. 5, 2014   (JP) ................. 2014-225115

(51) Int. Cl.
*H04N 5/225* (2006.01)
*H04N 5/232* (2006.01)
(Continued)

(52) U.S. Cl.
CPC ......... *H04N 5/23296* (2013.01); *G03B 15/00* (2013.01); *H04N 5/04* (2013.01);
(Continued)

(58) Field of Classification Search
None
See application file for complete search history.

(56) References Cited

U.S. PATENT DOCUMENTS 5,276,563 A * 1/1994 Ogawa ............... G02B 7/102
348/220.1
6,750,903 B1 * 6/2004 Miyatake ........... H04N 5/23238
348/218.1
(Continued)

FOREIGN PATENT DOCUMENTS

JP   62-159133   7/1987
JP   2003-087553   3/2003
(Continued)

*Primary Examiner* — Twyler Haskins
*Assistant Examiner* — Dwight C Tejano
(74) *Attorney, Agent, or Firm* — John C. Pokotylo; Straub & Pokotylo

(57) ABSTRACT

An imaging device for performing inter-exposure zoom photographing in which a zoom operation is performed during an exposure period, comprising: a zoom control section that controls a zoom-lens driving section; a photographing control section that instructs photographing to an image sensor; and an operation control section that causes the zoom control section and the photographing control section to execute control at the same time so that the photographing control section causes the image sensor to perform continuous photographing in synchronization with controlling of the zoom control section by driving a photographing lens in a predetermined direction, the zoom control section causes the zoom-lens driving section to output the driving amount for operating the zoom driving in a direction opposite to the predetermined direction, and the photographing control section causes the photographing to be performed with a part of a zoom position during exposure overlapped.

7 Claims, 14 Drawing Sheets

(51) Int. Cl.
*G03B 15/00* (2006.01)
*H04N 5/04* (2006.01)
*H04N 5/235* (2006.01)
*H04N 5/265* (2006.01)

(52) U.S. Cl.
CPC ........... *H04N 5/232* (2013.01); *H04N 5/2351* (2013.01); *H04N 5/2353* (2013.01); *H04N 5/2355* (2013.01); *H04N 5/265* (2013.01); *G03B 2205/0046* (2013.01)

(56) References Cited

U.S. PATENT DOCUMENTS

| | | | | |
|---|---|---|---|---|
| 2005/0099511 A1* | 5/2005 | Cazier | ................... | H03G 3/30 |
| | | | | 348/231.4 |
| 2005/0099514 A1* | 5/2005 | Cozier | ............... | H04N 5/23296 |
| | | | | 348/240.99 |
| 2005/0219386 A1* | 10/2005 | Stavely | ............. | H04N 5/23296 |
| | | | | 348/240.3 |
| 2015/0163413 A1* | 6/2015 | Ikeda | ................ | H04N 5/23216 |
| | | | | 348/240.99 |

FOREIGN PATENT DOCUMENTS

| | | |
|---|---|---|
| JP | 2010-152071 | 7/2010 |
| JP | 2010-164716 | 7/2010 |
| JP | 2010-166483 | 7/2010 |
| JP | 2014-022863 | 2/2014 |

* cited by examiner

FIG. 12A
| | ZOOM STEP | | | | | |
|---|---|---|---|---|---|---|
| | 1(Wide) ⇒ 2 | 2 ⇒ 3 | 3 ⇒ 4 | 4 ⇒ 5 | 5 ⇒ 6 | 6 ⇒ 7(Tele) |
| MAGNIFICATION | 2 | 2 | 3 | 3 | 4 | 4 |
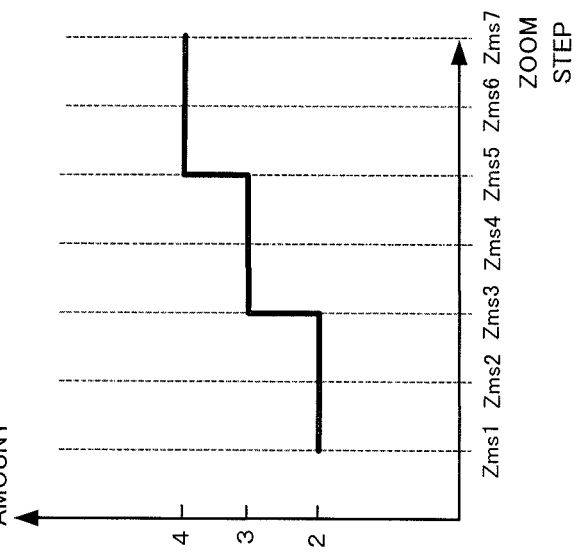
FIG. 12B
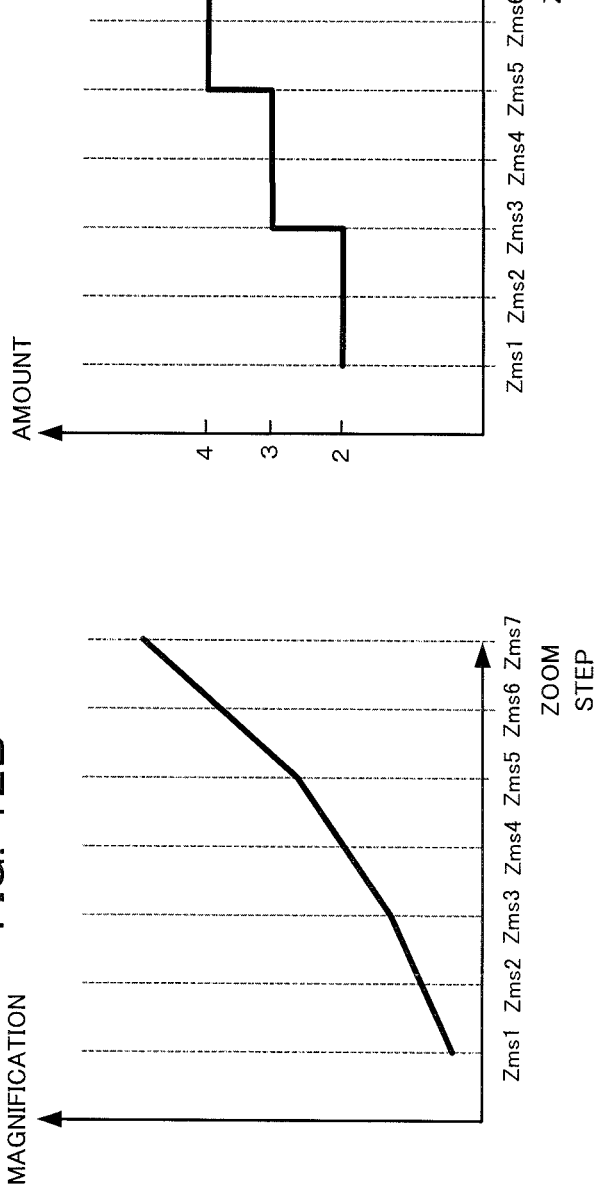
FIG. 12C

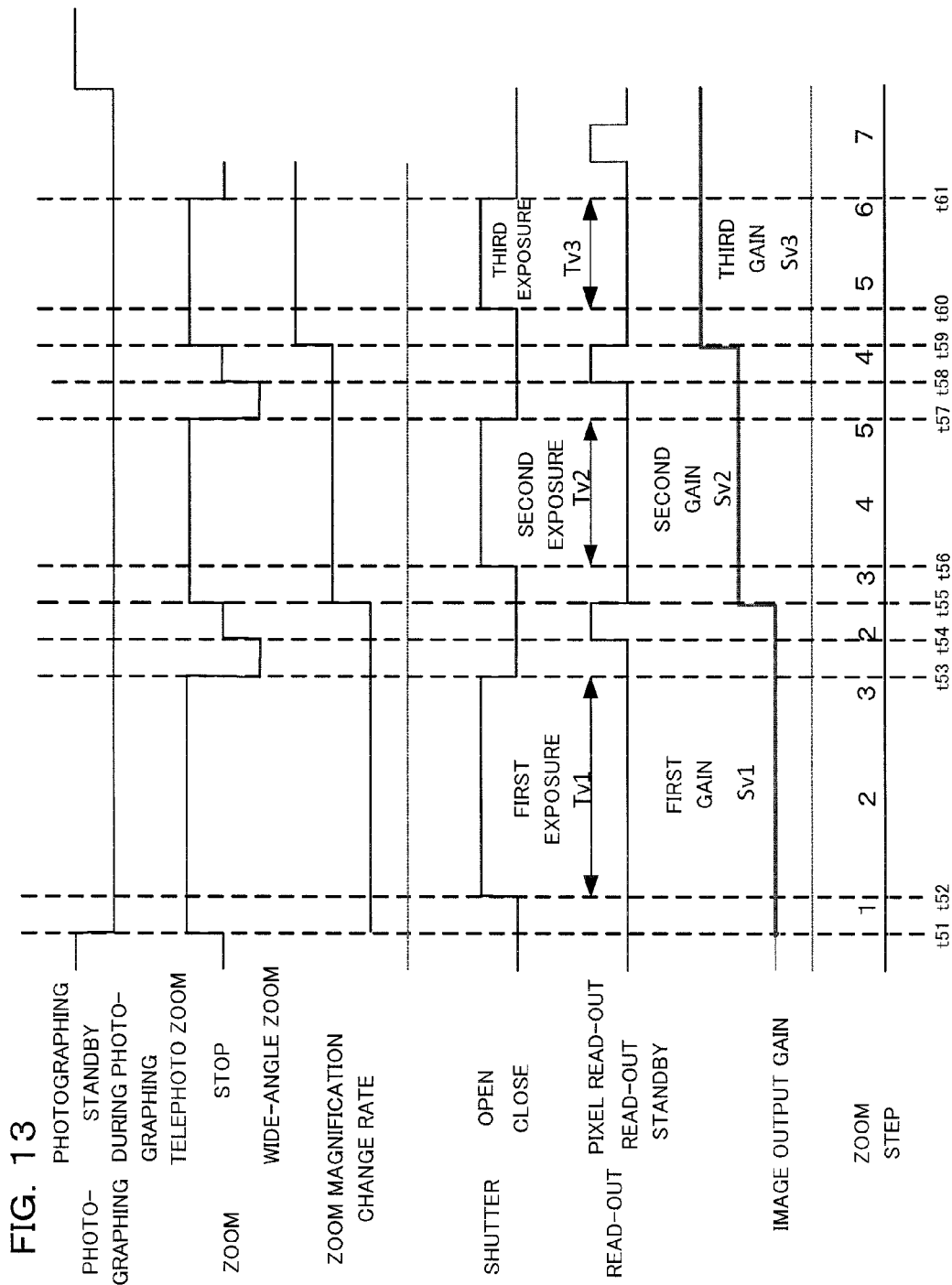

IMAGING DEVICE AND CONTROL METHOD FOR IMAGING DEVICE

This application is a Continuation application of PCT Application No. PCT/JP2015/059039, filed on Mar. 25, 2015 and based upon and claiming the benefit of priority from prior Japanese Patent Application No. 2014-225115, filed on Nov. 5, 2014, the entire contents of all of which are incorporated herein by reference.

BACKGROUND OF THE INVENTION

1. Field of the Invention

The present invention relates to an imaging device and a control method for the imaging device capable of zoom driving for changing a focal length during exposure, that is, capable of so-called inter-exposure zoom photographing.

2. Description of the Related Art

A photographing method called inter-exposure zoom photographing has been known. In this inter-exposure zoom photographing, photographing is performed while a focal length of a photographing optical system is changed during one session of exposure. In this photographing method, a photographing view of angle is changed during photographing, and magnification of a subject image is changed with that and thus, an image in which a trace of the subject is stretched radially outward from a center of the subject image can be obtained. By means of the inter-exposure zoom, a taken image giving an effect of highlighting the major subject image rather than a background can be obtained.

As described above, the inter-exposure zoom photographing has a well-known photographing method. However, this is a technology requiring experiences of a photographer in a photographing operation interlocking with the zoom driving of a photographing lens. Particularly when the photographer manually performs zoom driving, it is not easy to perform photographing by synchronizing a zoom driving operation of the photographing lens and a photographing operation relating to start and end operations of exposure. In order to solve this, Japanese Patent Laid-Open No. 2010-164716 and Japanese Patent Publication No. 7-23949 disclose a technology for facilitating the inter-exposure zoom photographing by electrically controlling the zoom driving so as to synchronize the zoom driving and the photographing operation with each other.

SUMMARY OF THE INVENTION

An imaging device according to a first aspect of the present invention is an imaging device for performing inter-exposure zoom photographing in which a zoom operation is performed during an exposure period, including: a photographing lens having a zoom lens; a zoom-lens driving section that changes a zoom magnification of the photographing lens; an image sensor that continuously photographs a subject image formed on an imaging surface by the photographing lens when the zoom-lens driving section drives the zoom lens and outputting a plurality of pieces of image data, respectively; an image processing section that executes image composition processing for generating a composite image from the plurality of pieces of image data obtained, respectively; a zoom control section that drives and controls the zoom-lens driving section; a photographing control section that instructs photographing to the image sensor; and an operation control section that causes the zoom control section and the photographing control section to execute control at the same time so that the photographing control section causes the image sensor to perform continuous photographing in synchronization with driving and controlling of the zoom control section by outputting a driving amount for changing the zoom magnification of the photographing lens in a predetermined direction to the zoom-lens driving section, the zoom control section causes the zoom-lens driving section to output the driving amount for operating the zoom driving in a direction opposite to the predetermined direction between the respective photographing in the continuous photographing, and the photographing control section causes the photographing to be performed with a part of a zoom position during exposure overlapped.

An imaging device according to a second aspect of the present invention is an imaging device for performing inter-exposure zoom photographing in which a zoom operation is performed during an exposure period, including: a photographing lens having a zoom lens; a zoom-lens driving section that changes a zoom magnification of the photographing lens; an image sensor that outputs a plurality of pieces of image data, respectively, by continuously photographing a subject image formed on an imaging surface by the photographing lens when the zoom-lens driving section drives the zoom lens; an image processing section that executes image composition processing for generating a composite image from the plurality of pieces of image data obtained, respectively; a zoom control section that drives and controls the zoom-lens driving section; a photographing control section that instructs photographing to the image sensor; and an operation control section that causes the zoom control section and the photographing control section to execute control at the same time so that the photographing control section causes the image sensor to perform first continuous photographing in synchronization with driving and controlling of the zoom control section by outputting a driving amount for moving the photographing lens in a first direction at a first zoom speed to the zoom-lens driving section, and the photographing control section causes the image sensor to perform second continuous photographing, which is continuous photographing, in synchronization with driving and controlling of the zoom control section by outputting a driving amount for moving the photographing lens in a second direction opposite to the first direction at the same zoom speed as the first zoom speed after the first continuous photographing is finished, wherein the operation control section controls the zoom control section in a zoom range with the zoom magnification of the lens when the second continuous photographing is performed different from that when the first continuous photographing is performed.

A control method for an imaging device according to a third aspect of the present invention is an imaging method by the imaging device having a zoom-lens driving section that changes a zoom magnification by moving the zoom lens relative to a photographing lens and performing inter-exposure zoom photographing in which a zoom operation is performed during an exposure period, including: a zoom control step of driving and controlling the zoom-lens driving section for changing the zoom magnification of the photographing lens; a photographing control step of obtaining a plurality of pieces of image data, respectively, by continuously photographing a subject image during driving by the zoom-lens driving section; and an image composition processing step of generating a composite image from the plurality of pieces of image data obtained, respectively, wherein the zoom control step and the imaging control step are made to execute control at the same time so that continuous photographing is performed in synchronization with the change of the zoom magnification of the photographing lens in a predetermined direction, zoom driving is operated in a direction opposite to the predetermined direction between the respective photographing in the continuous photographing, and the photographing is performed with a part of a zoom position during exposure overlapped.

BRIEF DESCRIPTION OF THE DRAWINGS

FIGS. 12A to 12C are graphs and tables illustrating changes of a zoom magnification and the like in a camera according to a second variation of the first and second embodiments of the present invention.

FIG. 13 is a timing chart illustrating an operation during the inter-exposure zoom photographing in the camera according to the second variation of the first and second embodiments of the present invention.

DETAILED DESCRIPTION OF THE PREFERRED EMBODIMENTS

An example in which the present invention is applied to a digital camera (hereinafter referred to as a camera) as preferred embodiments of the present invention will be described below. This camera has a function of inter-exposure zoom photographing of performing a zoom operation during an exposure period. Moreover, this camera has an imaging section for converting a subject image to image data. On the basis of the image data obtained by this imaging section, the subject image is live-view displayed on a display section. A photographer determines a composition or a shutter chance by observing the live-view display. In a release operation, the image data is recorded in a recording medium. The image data recorded in the recording medium can be reproduced and displayed on the display section by selecting a reproduction mode.

Moreover, when the inter-exposure zoom photographing mode is set, a plurality of sessions of photographing is performed by synchronizing zoom driving with a photographing operation so as to obtain a plurality of pieces of image data. In this case, when each session of the photographing is finished, the zoom driving is stopped in conjunction with the shutter or reading-out of the image data. However, it takes time for a driving speed to be a constant speed when the zoom driving is resumed. Thus, in this embodiment, a zoom position is slightly returned when the zoom driving is stopped when each session of the photographing is finished. The image data obtained within a zoom range in which a zoom speed is constant is subjected to relatively bright composition processing, and on the basis of the image data generated in this relatively bright composition processing, a progressive image during the inter-exposure zoom photographing is displayed.

Figure 1:
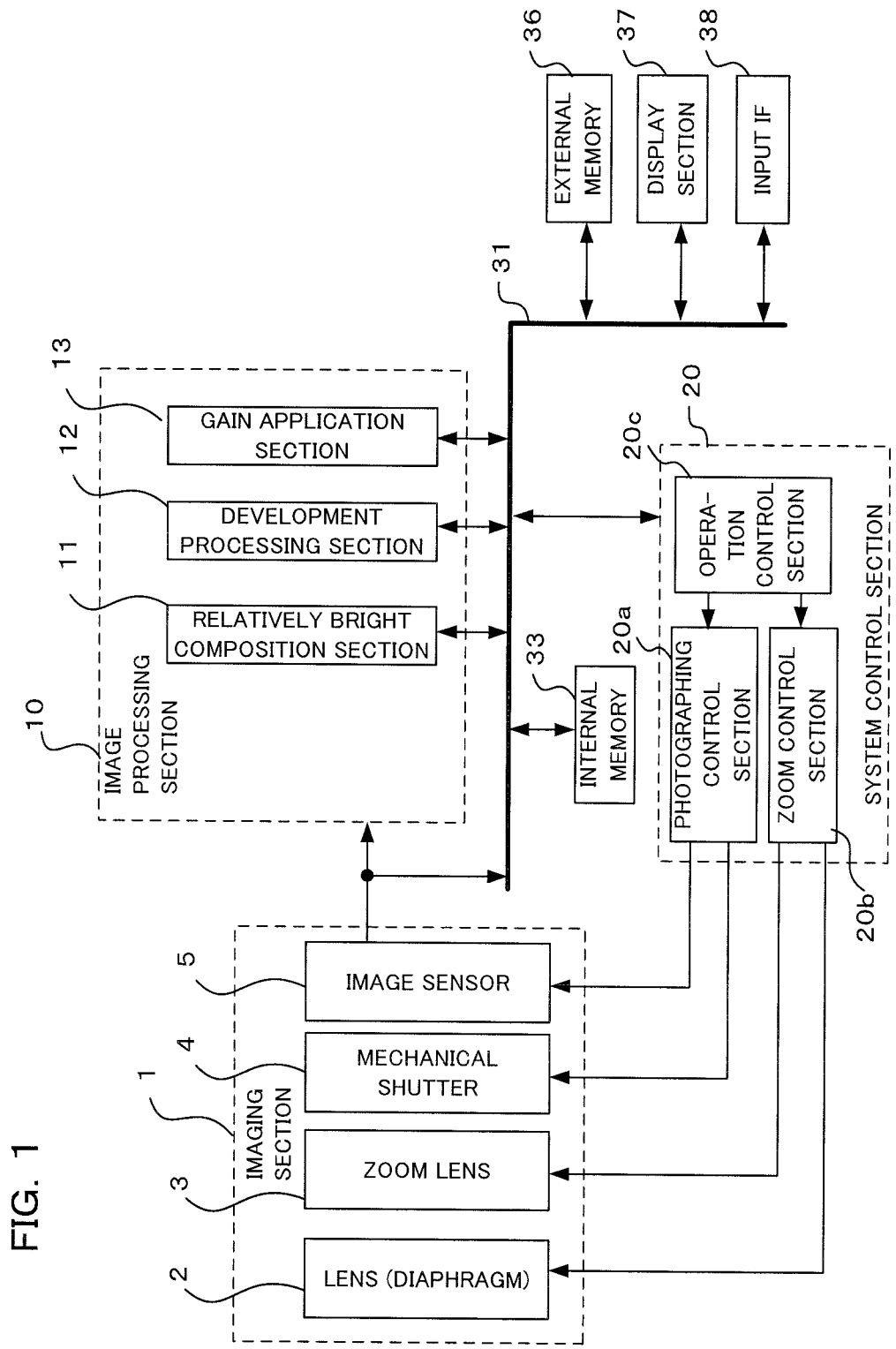
FIG. 1 is a block diagram mainly illustrating an electric configuration of a camera according to a first embodiment of the present invention.

FIG. 1 is a block diagram mainly illustrating an electric configuration of a camera according to a first embodiment of the present invention. The camera in this embodiment has an imaging section 1, an image processing section 10, a system control section 20, and a bus 31 and each section connected to that. In this embodiment, an example in which a photographing lens is integrally configured with a camera body is illustrated, but it may be a replaceable lens of a camera system in which the camera body and the photographing lens are separate.

The imaging section 1 has a lens 2, a zoom lens 3, a mechanical shutter 4, and an image sensor 5. The lens 2 is an optical system for forming an optical image of a subject on an image sensor 5 in collaboration with the zoom lens 3. In this lens 2, a diaphragm for determining an aperture value for adjusting an exposure amount is provided. The zoom lens 3 changes a focal length of the optical system and changes a view angle. The zoom lens 3 also has a zoom-lens driving section for changing a zoom magnification of the photographing lens.

The mechanical shutter 4 exposes or shields light to the image sensor 5 by an opening and closing operation and controls a shutter speed. The image sensor 5 includes an image sensor such as a CMOS image sensor or a CCD image sensor, converts an optical image of the subject formed by the lens 2 to an electric signal for each pixel and outputs an image signal to the image processing section 10 and the bus 31. The bus 31 is a signal line for performing transmission/reception of a signal between each block.

The image processing section 10 applies image processing to the image signal output from the image sensor 5. The image processing section 10 has a relatively bright composition section 11, a development processing section 12, and a gain application section 13, and also has processing sections for executing image processing for display, image processing for recording and the like. Moreover, the image processing section 10 detects brightness data of the image data from the image sensor 5 and outputs it to the system control section 20.

The relatively bright composition section 11 compares outputs for each corresponding pixel by using the image data continuously photographed and read out at each photographing from the image sensor 5 and the image data stored in an internal memory 33. On the basis of a result of this comparison, the relatively bright composition processing for selecting and composing the brighter image data for each pixel is executed. This processing is repeatedly executed at each photographing, and relatively bright composite image data is newly generated by using the relatively bright composite image data generated by executing the relatively bright composition processing at the previous photographing and the image data read out at each photographing.

That is, in the relatively bright composition processing in the relatively bright composition section 11, pixel data constituting the image data generated on the basis of the image signal read out first from the image sensor 5 is stored in the internal memory 33 as the relatively bright composite image data. Subsequently, the pixel data constituting the image data generated on the basis of the image signal read out from the image sensor 5 and a plurality of pieces of pixel data constituting the relatively bright composite image data stored in the internal memory 33 are compared for the corresponding pixel data, respectively, and the larger pixel data, that is, the brighter pixel data is detected, and the relatively bright composite image data is re-constituted by using the brighter pixel data. This processing is repeatedly executed each time the image signal is read out from the image sensor 5. By executing the relatively bright composition processing, an image of light traces can be obtained.

The relatively bright composition section 11 functions as an image composition processing section that generates a composite image from a plurality of pieces of image data obtained, respectively. Moreover, the relatively bright composition section 11 also functions as an image processing section that generates composite image data by performing the relatively bright composition processing on the image data continuously photographed in synchronization with driving of the zoom-lens driving section. The image composition processing is not limited to the relatively bright composition processing but may be either one of addition-averaging composition processing and simple addition processing.

The development processing section 12 performs development processing such as demosaicing, white balance adjustment, gamma correction and image compression on RAW image data that has been generated in the relatively bright composition section 11 and the image processing section 10.

The gain application section 13 performs application processing such as multiplication of a predetermined gain on the image data. For example, by multiplying the image data by 0.5 as the gain, a value of a brightness output of the image data becomes half and a dark image is obtained. By multiplying 2 as the gain, the brightness output of the image data is doubled and a bright image is obtained.

The internal memory 33 temporarily stores various setting information required in a camera operation, and progressive images at the time of image processing. The internal memory 33 is constituted by a volatile memory and a non-volatile memory. The volatile memory such as a DRAM is used for temporarily storing progressive images. A program for operation of the system control section 20 which will be described later, the various setting information and the like use the non-volatile memory such as a flash memory.

An external memory 36 is a non-volatile storage medium that can be freely loaded in the camera body or is fixed inside the camera, such as, for example, an SD card or a CF card. This external memory 36 records image data developed by the development processing section 12, and at the time of reproduction, the recorded image data is read out and can be output outside the camera.

The display section 37 has a rear surface display section such as TFT (Thin Film Transistor) liquid crystal or organic EL and/or an EVF (electronic viewfinder), and displays images (including live-view images) developed by the development processing section 12. The display section 37 also performs display of the progressive image on the basis of the relatively bright composite image data composed by the relatively bright composition section 11 during the inter-exposure zoom photographing. The display control of the display section 37 is executed by the system control section 20 which will be described later.

An input IF 38 has operating members such as a release button and a touch panel for inputting touch operations on a rear surface display section and the like, and performs various mode settings and gives instruction of a photographing operation such as release on the basis of the user operation.

The system control section 20 has a CPU (Central Processing Unit) and executes entire control of the camera in accordance with the program stored in the internal memory 33.

Moreover, the system control section 20 also functions as a zoom control section that drives and controls zoom lens driving provided in the zoom lens 3 (see a zoom control section 20b in the system control section 20 in FIG. 1). The system control section 20 also functions as a photographing control section that continuously photographing a subject image during driving by the zoom-lens driving section and for obtaining a plurality of pieces of image data, respectively (see a photographing control section 20a in the system control section 20 in FIG. 1). The photographing control section 20a and the zoom control section 20b are implemented by controlling each section in the camera by the CPU with software. However, other than software-like processing, a part of or the whole of the functions may be performed by hardware. The same applies to an operation control section 20c which will be described later.

Figure 2:
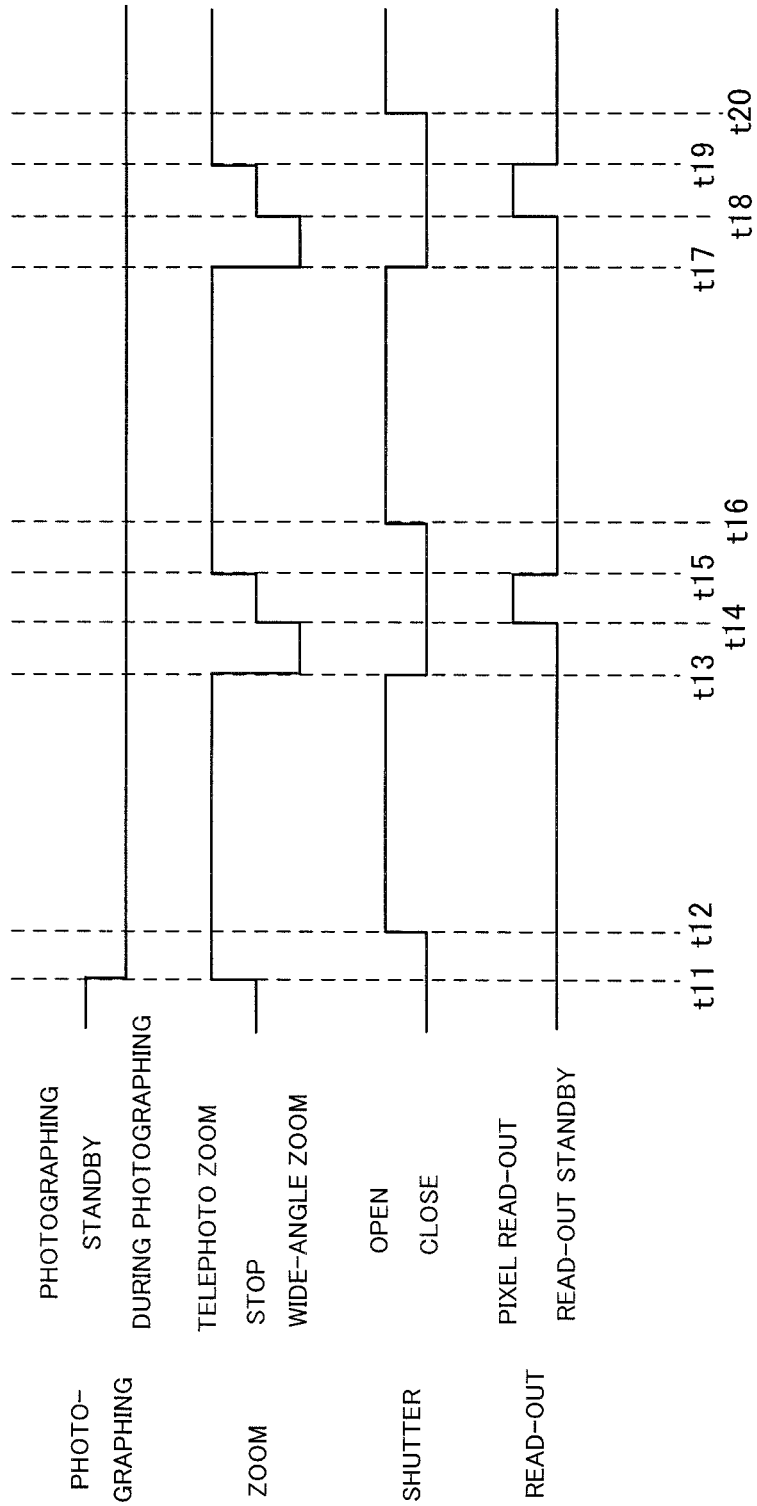
FIG. 2 is a timing chart illustrating an operation during inter-exposure zoom photographing in the camera according to the first embodiment of the present invention.

The system control section 20 functions as the operation control section that causes the zoom control section and the photographing control section to execute control at the same time (see the operation control section 20c in the system control section 20 in FIG. 1) so that continuous photographing is performed (see times t12 to t13 and t16 to t17 in FIG. 2, for example) in synchronization with a change of the zoom magnification of the photographing lens by the zoom-lens driving section in a predetermined direction and the zoom-lens driving section operates the zoom driving between the respective photographing in the continuous photographing in a direction opposite to the predetermined direction, and photographing is performed with a part of the zoom position during exposure overlapped (see times t13 to t14 and t17 to t18 in FIG. 2, for example).

Moreover, the system control section 20 functions as the operation control section that causes the zoom control section and the photographing control section to execute control at the same time so that first continuous photographing is performed (see times t12 to t13, t14 to t15, and t16 to t17 in FIG. 6, for example) in synchronization with movement of the photographing lens by the zoom-lens driving section in a first direction at a first zoom speed, and second continuous photographing is performed (see times t20 to t21 and t22 to t23 in FIG. 6, for example) in synchronization with movement of the photographing lens by the zoom-lens driving section in a second direction opposite to the first direction at the same zoom speed as the first zoom speed after the first continuous photographing is finished. This operation control section controls in a zoom range with the zoom magnification of the lens when the second continuous photographing is performed different from that when the first continuous photographing is performed (see FIG. 7, for example).

The system control section 20 functions as a brightness determining section that determines whether or not light with a predetermined brightness or more has entered (see S19 in FIG. 4, for example) on the basis of the brightness data of the image data. Moreover, the system control section 20 functions as the photographing control section that discards the image data and performing the continuous photographing if the brightness determining section determines that the light with the predetermined brightness or more has entered (S19 Yes->S23 in FIG. 4, for example). The system control section 20 functions as the operation control section (see the operation control section 20c in the system control section 20 in FIG. 1) that causes the photographing control section to perform the continuous photographing again after causing the zoom-lens driving section to move the image data again to a zoom magnification position where the image data was discarded (S23 in FIG. 4, for example).

The system control section 20 functions as the photographing control section (see the operation control section 20c in the system control section 20 in FIG. 1) that changes sensitivity or setting of exposure time when the respective images are taken in accordance with a change amount of a zoom enlargement rate controlled by the zoom control section for a photographing condition when the continuous photographing is performed using the zoom driving by the zoom-lens driving section (see FIG. 13, for example).

The system control section 20 functions as the photographing control section that performs photographing in a state in which the zoom driving is stopped at least once of at the beginning, in the middle, and at the end of the continuous photographing when the continuous photographing is performed using the zoom driving by the zoom-lens driving section (see the photographing control section 20a in the system control section 20 in FIG. 1. See operation stop 61a, 61b, and 61N in FIG. 9 or FIG. 11, for example). Moreover, the system control section 20 functions as a display control section that executes display control for the display section 37 (see the relatively bright composition/display processing at S17 in FIG. 4, S37 in FIG. 8 and the like, for example).

Subsequently, an operation in the inter-exposure zoom photographing in this embodiment will be described by using FIGS. 2 and 3. FIG. 2 is a timing chart illustrating the zoom driving, the shutter operation, and the reading-out operation of the image sensor 5 when an inter-exposure zoom photographing mode is set.

On an uppermost stage in FIG. 2, a photographing operation is illustrated. At the time t11, the photographer operates the release button which is one of the input IF 38, which starts the inter-exposure zoom photographing. During the inter-exposure zoom photographing, a plurality of sessions of the photographing is repeated in accordance with the opening/closing operation of the shutter, and on the uppermost stage in FIG. 2, a period during which this continuous photographing is performed is displayed as "during photographing".

When the inter-exposure zoom photographing is started at the time t11, first, the zoom driving is performed to a telephoto side. Here, the driving section of the zoom lens 3 performs driving so that the focal length is on the telephoto side in accordance with an instruction from the system control section 20. At this point of time, since the mechanical shutter 4 is in a closed state, the subject image is not formed on the image sensor 5, and thus, exposure is not performed.

At the time t12, the driving speed of the zoom lens 3 becomes a constant speed, the mechanical shutter 4 is opened, the subject image is formed on the image sensor 5, and each pixel of the image sensor 5 performs photoelectric conversion.

At the time t13, the mechanical shutter 4 is closed, and the zoom driving is performed to a wide-angle side. A period of time from the time t12 to the time t13 is first exposure time (shutter speed) in a plurality of sessions of continuous photographing. This exposure time shall be proper exposure time calculated on the basis of subject brightness. Other than the above, it may be set manually by the photographer or may be determined as a design value in advance.

Moreover, at the time t13, the zoom driving is performed to the wide-angle side so that, when the zoom driving to the telephoto side is resumed at the time t15, the zoom speed becomes a constant speed at start of the exposure by the image sensor 5. Therefore, a zoom driving amount to the wide-angle side may be such a degree that the constant speed is obtained when the zoom range is reached at the previous end of the exposure if the zoom driving is resumed to the telephoto side from a position where the zoom position is returned.

At the time t14, the zoom driving is stopped, and the image data is read out from the image sensor 5. Here, during a period of time from the time t12 to the time t13, the image sensor 5 is exposed, and the image data generated during this period is read out. Since the photographing is performed while the focal length of the zoom lens 3 is being changed, the view angle is changed, and an image with traces as if a bright portion flows can be obtained.

At the time t15, similarly to the time t11, the zoom driving to the telephoto side is started with the mechanical shutter 4 kept closed. In FIG. 2, the zoom driving is started to the wide-angle side at the time t13, the zoom driving is stopped at the time t14 and the reading-out of the image data from the image sensor 5 is started at the same time, and the zoom driving to the telephoto side is resumed at the time t15 and the reading-out of the image data from the image sensor 5 is finished at the same time. However, this timing is not limiting, and it is only necessary that during a period of time from the time t13 to the time t16, the zoom lens 4 is moved to the wide-angle side once, it is directed toward the telephoto side again and the constant speed is reached, and the reading-out of the image data from the image sensor 5 is finished.

At the time t16, since the driving speed of the zoom driving to the telephoto side reaches the constant speed, similarly to the time t12, the mechanical shutter 4 is opened, the subject image is made to expose to the image sensor 5, and photoelectric conversion is performed. The aforementioned operation is repeatedly performed after that at the times t13, t14, . . . . When the photographer instructs to finish the inter-exposure zoom photographing by pressing on the release button again (or by releasing the hand from the release button) and the like, the photographing is finished.

As described above, in this embodiment, the zoom driving is started to the telephoto side (time t11), and when the driving speed reaches the constant speed (time t12), the mechanical shutter 4 is opened, and the exposure operation by the image sensor 5 is performed. Then, when predetermined time has elapsed (time t13), the mechanical shutter 4 is closed, and the image data is read out from the image sensor 5 (times t14 to t15). Moreover, after the zoom driving to the wide-angle side (times t13 to t14), the zoom driving is performed again to the telephoto side (times t15 to t16). By repeating this photographing operation (exposure operation), a plurality of pieces of image data can be obtained. These operations are performed by means of control of each section in the camera by the photographing control section 20a and the zoom control section 20b in accordance with the instruction of the operation control section 20c.

Figure 3:
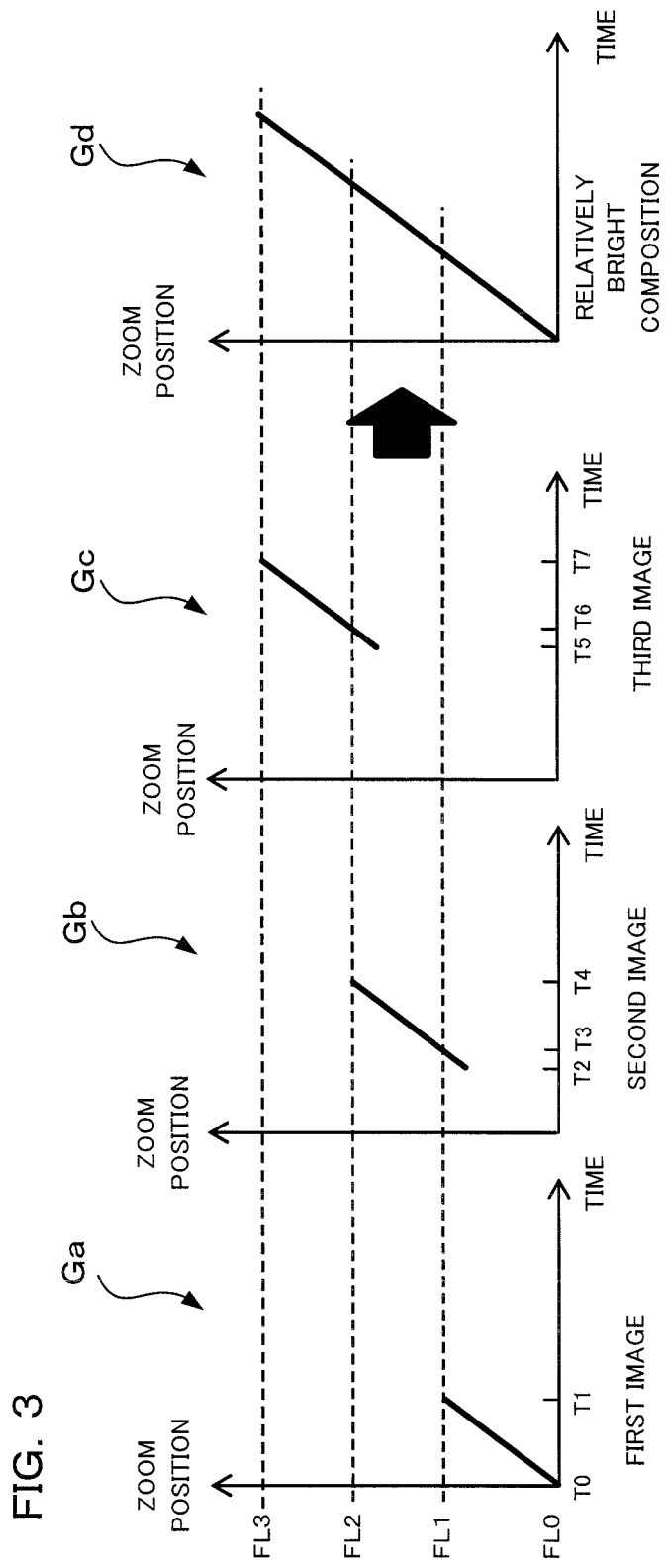
FIG. 3 is a graph illustrating a zoom position at each photographing in the camera according to the first embodiment of the present invention.

FIG. 3 illustrates the zoom range when the aforementioned continuous photographing is repeated. A graph Ga in FIG. 3 indicates the zoom range at photographing of a first image in the continuous photographing, a graph Gb in FIG. 3 indicates the zoom range at photographing of a following second image, and a graph Gc in FIG. 3 indicates the zoom range at photographing of a third image.

That is, in photographing of the first image, photographing is performed in the zoom range with focal lengths FL0 to FL1 at times T0 to T1. The time T0 corresponds to the time t12 in FIG. 2, and the time T1 corresponds to the time t13. Moreover, in photographing of the second image, the inter-exposure zoom photographing is performed in the zoom range with the focal lengths FL1 to FL2 at times T3 to T4. However, in the photographing of the second image, since the exposure has been started at the time T2 (corresponding to the time t16 in FIG. 2), the inter-exposure zoom photographing is performed actually from the wide-angle side rather than the focal length FL1.

Similarly, as illustrated in the graph Gc in FIG. 3, the inter-exposure zoom photographing is performed in the zoom range with the focal lengths FL2 to FL3 at times T5 to T7 (actually, from the wide-angle side rather than FL2 as described before).

As illustrated in the graphs Ga to Gc in FIG. 3, a plurality of sessions of photographing is performed by the imaging section 1 while the zoom range is changed during the exposure and when the plurality of pieces of image data is obtained, the relatively bright composition section 11 generates a piece of the image data by applying the relatively bright composition processing to the plurality of pieces of image data, respectively. A graph Gd in FIG. 3 indicates a zoom range during full exposure to the composite image data generated by the relatively bright composition processing of the relatively bright composition section 11. By generating a plurality of pieces of the image data, the images of the inter-exposure zoom photographing corresponding to the focal lengths FL0 to FL2 can be generated.

In this embodiment, since the mechanical shutter 4 is opened for exposure after the driving speed of the zoom driving reaches the constant speed, the image is not uneven. Moreover, when the exposure for the first image is finished, the zoom lens is returned once to the wide-angle side and then, the driving to the telephoto side is resumed and thus, exposure loss is not generated.

Subsequently, a flow of processing of the camera in this embodiment will be described by using a flowchart illustrated in FIG. 4. This flowchart is executed by control of each section by the system control section 20 in accordance with the program stored in the internal memory 33 (the same applies to FIGS. 8 and 10 which will be described later).

This flow is started when the release button is operated in a state in which the inter-exposure zoom photographing mode is set. First, the zoom driving is started (S1). Timing of this Step S1 corresponds to the time t11 in FIG. 2. At this Step, the zoom-lens driving section starts driving of the zoom lens 3 at the constant speed so as to change the focal length toward the telephoto side.

When the zoom driving is started, then, exposure of a first image is started (S3). The timing of this Step S3 corresponds to the time t12 in FIG. 2. At this Step, the mechanical shutter 4 is opened, the subject image is formed on the image sensor 5, and the exposure operation is started.

When the exposure of the first image is started, then, it is determined whether or not exposure time has elapsed (S5). This exposure time corresponds to time during the times t12 to t13 in FIG. 2. The exposure time shall be time when proper exposure is obtained, but it may be set by other setting methods such as manual setting by the photographer other than the above.

When predetermined time has elapsed since the exposure of the first image was stated, the exposure of the first image is finished, the image data is read out, the zoom operation is stopped, and the zoom position is returned (S7). The timing at this Step S7 corresponds to the times t13 to t15 in FIG. 2. At this Step, the mechanical shutter 4 is closed, the image data is read out from the image sensor 5, and the zoom driving of the zoom lens 3 is stopped.

Moreover, at this Step S7, the zoom driving is performed so that the focal length of the zoom lens 3 is changed from the telephoto side toward the wide-angle side. A return amount in this case is different depending on stability at the driving of a zoom motor driving the zoom lens 3. As described above, it can be a return amount to such a degree that the constant speed is obtained when the end portion of the previous zoom range is reached when the driving toward the telephoto side is started. For example, assuming that the return driving amount is at a position half of the zoom driving amount of the first image, the constant speed can be usually obtained at the end portion of the previous zoom range. An order of each processing at Step S7 may be performed in parallel as appropriate, or the order may be changed, and a processing procedure at the times t13 to t15 in FIG. 2 is not limiting.

Subsequently, the zoom position is recorded, and the zoom driving is started (S9). The timing at this Step S9 corresponds to the time t15 in FIG. 2. At Step S7, the zoom position has been returned, and the zoom lens 3 is driven so that the focal length is changed from this position to the telephoto side. By stopping once (times t14 to t15 in FIG. 2) before the zoom driving to the telephoto side is started, the zoom driving can be accelerated stably. The zoom position recorded at this Step is used at Step S23 which will be described later.

When the zoom driving is started and the zoom position where the driving speed of the zoom driving becomes constant is reached, then, exposure of the N-th image is started (S11). The timing of this Step S11 corresponds to the timing of the time t16 in FIG. 2. Here, similarly to Step S3, the mechanical shutter 4 is opened, the subject image is formed on the image sensor 5, and the exposure operation is started.

When the exposure of the N-th image is started, then, it is determined whether or not the exposure time has elapsed (S13). Here, similarly to Step S5, elapse of the exposure time is awaited. If the exposure time has elapsed as the result of determination at this Step S13, similarly to Step S7, the exposure of the N-th image is finished, the zoom operation is stopped, the N-th image is read out, and the zoom position is returned (S15).

Subsequently, the relatively bright composition processing and the display are performed (S17). Assuming now that N=2, that is, the second piece of the image data is to be read out, the relatively bright composition section 11 executes the relatively bright composition processing by using the first image of the image data read out at Step S7 and the second image of the image data read out at Step S15. Since the focal length has changed (since the zoom magnification has changed), bright portions become traces by executing the relatively bright composition processing. Moreover, since the exposure is performed in the zoom range where the zoom driving is made at the constant speed, uneven density does not occur in the image. Furthermore, since the zoom position has been returned, an image without a seam of exposure between the first image and the second image is obtained. Here, the generated relatively bright composite image data is temporarily stored in the internal memory 33.

In the case of N=3 or more, the relatively bright composition processing is executed by using the relatively bright composite image data generated at the previous time and temporarily stored and the image data read out at this Step S15.

Moreover, at Step S17, the progressive image of the inter-exposure zoom photographing is displayed on the display section 37 on the basis of the image data generated by the relatively bright composition processing. The photographer can confirm whether or not the photographing has been performed in accordance with the intension by observing this progressive image and also can determine timing of end of the inter-exposure zoom photographing.

Once the relatively bright composition processing and the display are performed, then, it is determined whether or not a level increase is at a light measurement point set value or more (S19). Here, it is determined whether or not the brightness at the light measurement point has increased by the set value or more as compared with the first image. If light other than expected such as a head light of an automobile, for example, enters during the inter-exposure zoom photographing, an image of the inter-exposure zoom photographing according to the intention of the photographer cannot be obtained. Thus, at this Step, it is determined whether or not there is such abnormal light. It is convenient to enable arbitrary setting of the light measurement point by the photographer from the whole screen.

If there is an increase by the set value or more as the result of determination at Step S19, the zoom lens is returned to the recorded zoom position, and the N-th taken image is discarded (S23). In this case, since the abnormal light has entered, the image data read out at Step S15 and the image data of the relatively bright composition generated by using this image data are discarded. As the image data of the relatively bright composition, the image data generated after the exposure of the N−1th image is temporarily stored. Then, in order to perform exposure of the N-th image again, the zoom lens is returned to the zoom position recorded at Step S9. When the zoom lens is returned to the recorded zoom position, the process proceeds to Step S11, and the exposure of the N-th image is performed again.

As the result of the determination at Step S19, if there is no level increase by the set value or more, it is determined whether or not the position is on the zoom position of the photographing completed (S21). In this embodiment, if the photographer finishes the inter-exposure zoom photographing, the photographer presses on the release button again (or releases the hand from the release button) and if this operation is performed, it is determined whether or not the position is on the end of the zoom range where this operation is performed. Moreover, it is also determined whether or not the position is on the end portion of the focal length on the telephoto side.

As the result of the determination at Step S21, if the zoom position of the photographing completed is not reached, one is added to the number N of taken images, the process returns to Step S9, and the subsequent exposure is performed. On the other hand, if the zoom position of the photographing completed is reached as the result of the determination, the flow of this inter-exposure zoom photographing is finished.

As described above, in the flow of the inter-exposure zoom photographing, the zoom position of the zoom lens is returned once between the exposure and the exposure, and the image data is obtained within the zoom range with the constant speed (see S7 and S15). Thus, when the relatively bright composition processing is executed, occurrence of uneven density in the image or exposure loss between the exposure and the exposure can be prevented.

Moreover, if the abnormal light enters, the photographing with the incident abnormal light is discarded, and the photographing is performed again for the zoom range of the photographing (S19 Yes, S23, S11). Thus, it is not necessary to perform all the photographing again at the inter-exposure zoom photographing.

Figure 5:
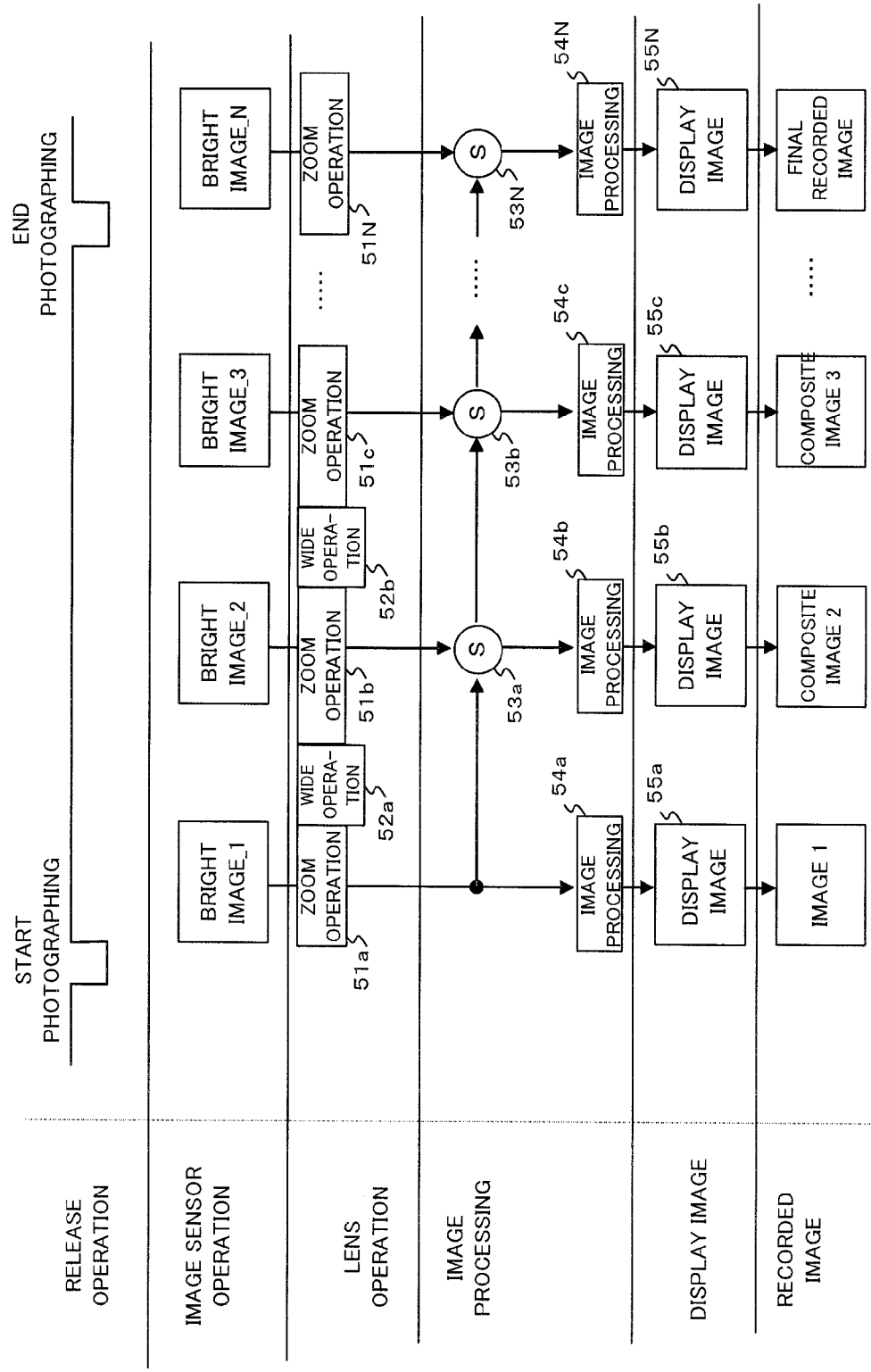
FIG. 5 is a view illustrating image processing in the camera according to the first embodiment of the present invention.

Subsequently, the flow of the image processing will be described by using FIG. 5. When the photographing is started by the release operation (time t11 in FIG. 2), a zoom operation 51a is performed, and image processing 54a is executed to the image data of a bright image_1 exposed when this zoom operation was performed. A display image 55a is displayed on the display section 37 on the basis of the image data to which the image processing 54a is applied, and an image 1 is stored in the internal memory 33.

When the zoom operation 51a is finished, a wide operation 52a is performed. This corresponds to the zoom driving to the wide-angle side at the times t13 to t14 in FIG. 2 and corresponds to the processing of returning the zoom position at Step S7 in FIG. 2.

When the wide operation 52a is finished, a zoom operation 51b is performed. Relatively bright composition processing 53a is executed by using the image data based on a bright image_2 obtained at this time and the image data based on the bright image_1, and image processing 54b is applied to the generated image data. A display image 55b is displayed on the display section 37 on the basis of the image data to which this image processing 54b is applied, and a composite image 2 is stored in the internal memory 33.

After that, the zoom operation, the wide operation, the relatively bright composition processing, the image processing, display of the display image, and storage of the composite image are performed sequentially. Then, when the photographing end operation is performed, relatively bright composition processing 53N is executed by using the image data based on a bright image_N to which a zoom operation 51N is applied, and image processing 54N is applied to the generated image data. On the basis of the image data to which this image processing 54b is applied, a display image 55N is displayed as a final image on the display section 37, and the final recorded image 2 is recorded in the external memory 36.

As described above, in this embodiment, each time the image data based on the bright image in each zoom operation is obtained, the relatively bright composition is performed, and it is displayed as a progressive image (composite image) on the display section 37. Thus, the photographer can confirm the progressive image during the inter-exposure zoom photographing.

Subsequently, a second embodiment of the present invention will be described by using FIGS. 6 to 8. In the first embodiment, when the zoom driving is performed to the telephoto side during a predetermined period of time and photographing is made, the zoom position is returned to the wide-angle side once and then, the zoom driving is performed to the telephoto side. On the other hand, in the second embodiment, when the photographing is made while the zoom driving is performed to the telephoto side during the predetermined period of time, the image data is obtained by performing photographing while the zoom driving is performed a plurality of sessions toward the telephoto side without returning the zoom position to the wide-angle side in the middle of the photographing. Then, when the final position of the telephoto side is reached, the zoom driving is performed to the wide-angle side, and the image data of the zoom range corresponding to a gap of the plurality of sessions of photographing is obtained.

Since the electric configuration in this embodiment is the same as that of the block diagram in FIG. 1, the description will be omitted.

An operation in this embodiment will be described by using a timing chart illustrated in FIG. 6. A photographing operation is illustrated on an uppermost stage in FIG. 6. At time t31, when the photographer operates the release button, the inter-exposure zoom photographing is started. During the inter-exposure zoom photographing, similarly to the first embodiment, a plurality of sessions of the photographing is repeated in accordance with the opening/closing operation of the shutter, and on the uppermost stage of FIG. 6, a period during which this continuous photographing is performed is displayed as "during photographing".

When the inter-exposure zoom photographing is started at the time t31, first, the zoom driving is performed to the telephoto side. Here, the driving section of the zoom lens 3 performs driving so that the focal length is on the telephoto side in accordance with an instruction from the system control section 20. At this point of time, since the mechanical shutter 4 is in the closed state, the subject image is not formed on the image sensor 5, and thus, exposure is not performed.

At the time t32, the driving speed of the zoom lens 3 becomes a constant speed, the mechanical shutter 4 is opened, the subject image is formed on the image sensor 5, and each pixel of the image sensor 5 performs photoelectric conversion.

At the time t33, the mechanical shutter 4 is closed. However, the zoom driving is not stopped. A period of time from the time t32 to the time t33 is exposure time (shutter speed) per one session in the plurality of sessions of the continuous photographing. Similarly to the first embodiment, the exposure time shall be proper exposure time calculated on the basis of the subject brightness. Other than the above, it may be determined in advance, may be set as a design value, or may be manually set by the photographer.

Moreover, at the time t33, the image data is read out from the image sensor 5. Here, the image sensor 5 is exposed during a period from the time t32 to the time t33, and the image data generated during this period is read out. Since the photographing is performed while the focal length of the zoom lens 3 is being changed, an image with traces as if they are flowing can be obtained.

At the time t34, the mechanical shutter 4 is opened, the subject image is exposed to the image sensor 5, and photoelectric conversion is performed. Then, at the time t35, while the zoom driving is continued, the mechanical shutter 4 is closed, and the image data is read out from the image sensor 5. Similarly, at time t36, the mechanical shutter 4 is opened, the subject image is exposed to the image sensor 5, and photoelectric conversion is performed. Then, at time t37, the zoom driving is stopped, the mechanical shutter 4 is closed, and the image data is read out from the image sensor 5.

At time t38, the zoom driving is started to the wide-angle side, the mechanical shutter 4 is opened, the subject image is exposed to the image sensor 5, and photoelectric conversion is performed. At time t39, while the zoom driving to the wide-angle side is continued, the mechanical shutter 4 is closed, and the image data is read out from the image sensor 5. Assuming that the times t36 to t37 are indicated by time t1 and the times t38 to t40 are indicated by time t2, it is set so that t1>t2 is obtained. Since the image data read out at the time t39 may be discarded without being used, only a reset operation of the image sensor 5 is sufficient.

At the time t40, while the zoom driving to the wide-angle side is continued, the mechanical shutter 4 is opened, the subject image is exposed to the image sensor 5, and photoelectric conversion is performed. At the time t41, while the zoom driving to the wide-angle side is continued, the mechanical shutter 4 is closed, and the image data is read out from the image sensor 5. After that, until the zoom lens is returned to the first position, opening/closing of the mechanical shutter 4, photoelectric conversion of the image sensor 5, and the reading-out of the image data are repeated while the zoom driving to the wide-angle side is continued.

Subsequently, a zoom range when the continuous photographing is repeated will be described by using FIG. 7. A graph Ha in FIG. 7 indicates a zoom range at photographing of a first image in the continuous photographing, a graph Hb in FIG. 7 indicates a zoom range of a following second image, a graph Hc in FIG. 7 indicates a zoom range of a third image, a graph Hd in FIG. 7 indicates a zoom range of a fourth image, a graph He in FIG. 7 indicates a zoom range of a fifth image, and a graph Hf in FIG. 7 indicates a zoom range of a sixth image.

Figure 6:
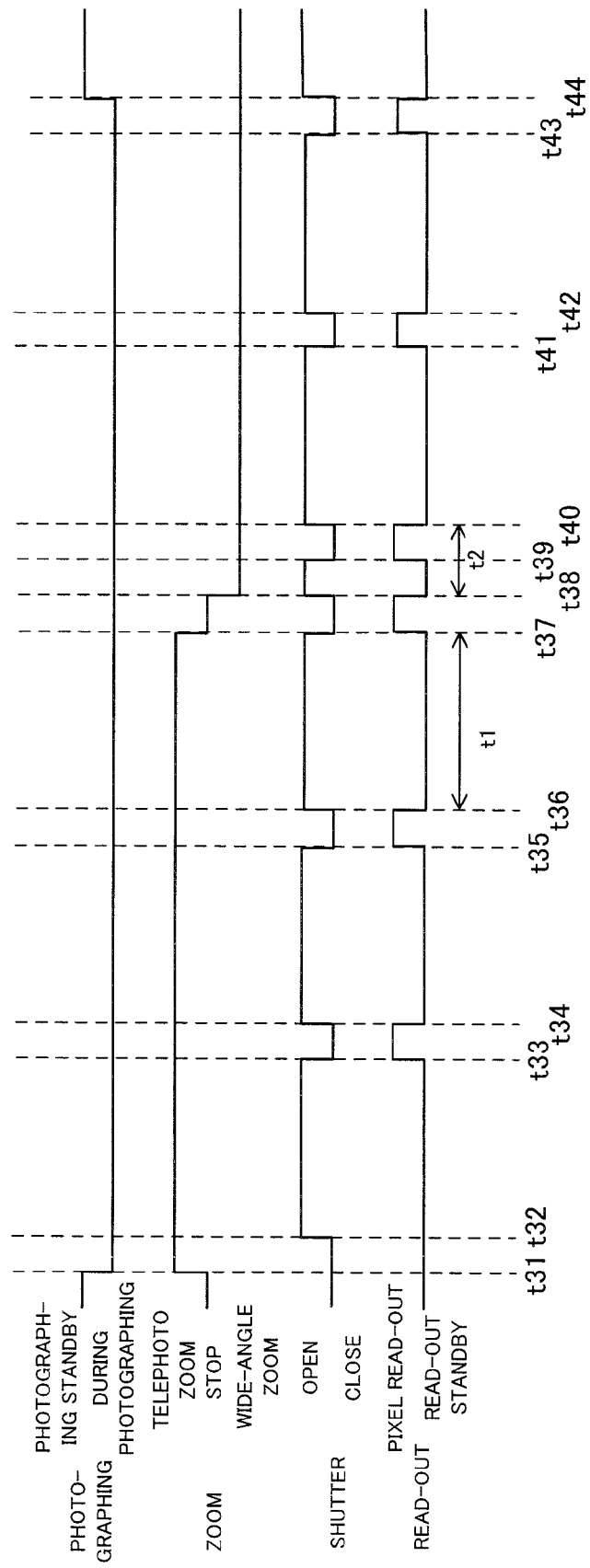
FIG. 6 is a timing chart illustrating an operation during the inter-exposure zoom photographing in a camera according to a second embodiment of the present invention.
Figure 7:
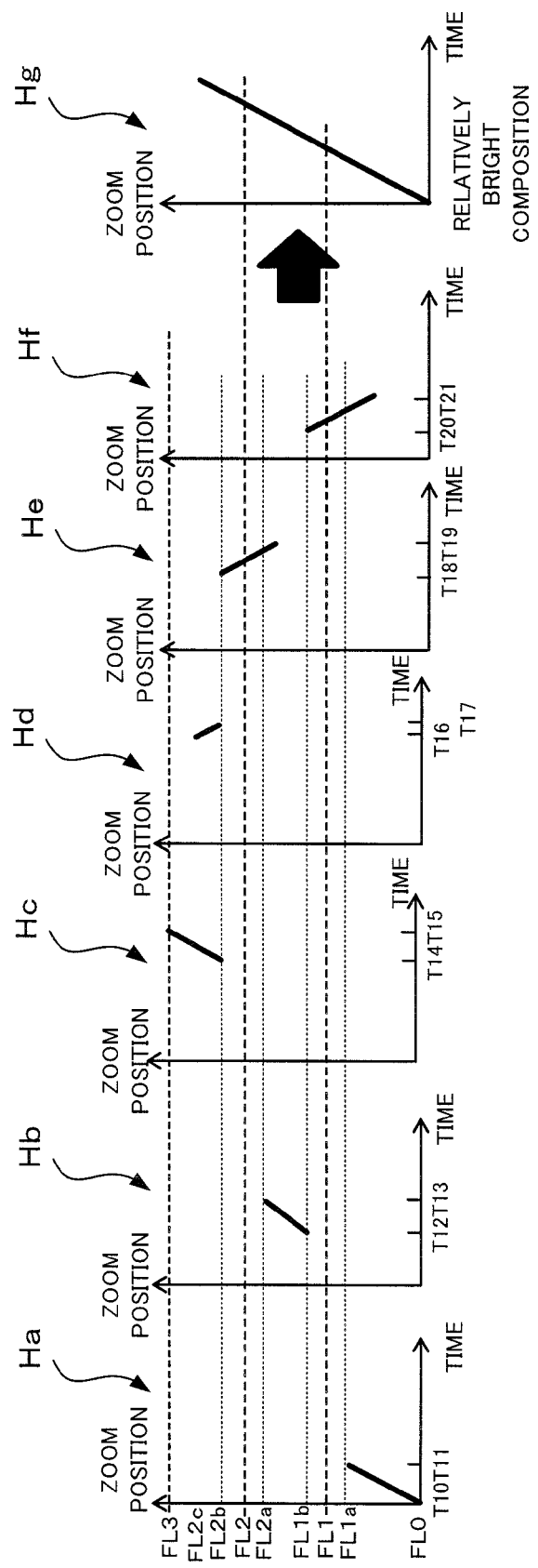
FIG. 7 is a graph illustrating a zoom position at each photographing in the camera according to the second embodiment of the present invention.

That is, in photographing of the first image illustrated in the graph Ha in FIG. 7, photographing is performed in the zoom range with focal lengths FL0 to FL1a at times T10 to T11. The time T10 corresponds to the time t32 in FIG. 6, and the time T11 corresponds to the time t33. Moreover, in photographing of the second image illustrated in the graph Hb in FIG. 7, the inter-exposure zoom photographing is performed in the zoom range with the focal lengths FL1b to FL2a at times T12 to T13. The time T12 corresponds to the time t34 in FIG. 6, and the time T13 corresponds to the time t35. As can be seen from the graphs Ha and Hb in FIG. 7, photographing is not performed in the zoom range with the focal lengths FL1a to FL1b. This zoom range with exposure loss is compensated for in the photographing of the sixth image which will be described later (see the graph Hf in FIG. 7).

In photographing of the third image illustrated in the graph Hc in FIG. 7, inter-exposure zoom photographing is performed in the zoom range with focal lengths FL2b to FL3a at times T14 to T15. The time T14 corresponds to the time t36 in FIG. 6, and the time T15 corresponds to the time t37. As can be seen from the graphs Hb and Hc in FIG. 7, photographing is not performed in the zoom range with the focal lengths FL2a to FL2b. This zoom range with exposure loss is compensated for in the photographing of the fifth image which will be described later (see the graph He in FIG. 7).

In photographing of the fourth image illustrated in the graph Hd in FIG. 7, inter-exposure zoom photographing is performed in the zoom range with focal lengths FL2c to FL3b at times T16 to T17. The time T16 corresponds to the time t38 in FIG. 6, and the time T17 corresponds to the time t39. The image data obtained here is not used as described above.

In photographing of the fifth image illustrated in the graph He in FIG. 7, inter-exposure zoom photographing is performed in the zoom range including at least focal lengths FL2b to FL2a at times T18 to T19. The time T18 corresponds to the time t40 in FIG. 6, and the time T19 corresponds to the time t41.

In photographing of the sixth image illustrated in the graph Hf in FIG. 7, inter-exposure zoom photographing is performed in the zoom range including at least focal lengths FL1b to FL1a at times T20 to T21. The time T20 corresponds to the time t42 in FIG. 6, and the time T21 corresponds to the time t43.

As illustrated in the graphs Ha to Hf in FIG. 7, when a plurality of sessions of photographing is performed, and a plurality of pieces of the image data is obtained, one piece of the image data is generated by the relatively bright composition processing. A graph Hg in FIG. 7 illustrates a zoom range of the composite image data generated by the relatively bright composition processing. By generating the plurality of pieces of the image data, the image of the inter-exposure zoom photographing corresponding to the focal lengths FL0 to FL2 can be generated.

That is, by using the image data obtained in the first photographing for the focal lengths FL0 to FL1a, the image data obtained in the sixth photographing for the focal lengths FL1a to FL1b, the image data obtained in the second photographing for the focal lengths FL1b to FL2a, the image data obtained in the fifth photographing for the focal lengths FL2a to FL2b, and the image data obtained in the third photographing for the focal lengths FL2b to FL3, the image data for all the zoom ranges can be obtained.

In this embodiment, instead of reversing at short intervals during the zoom driving as in the first embodiment, reversing is performed after the continuous photographing by the zoom driving in one direction is completed, and photographing is performed so as to include the zoom range lost during the continuous photographing in the one direction while the zoom driving is being performed in the reversed direction, and the photographing is finished when the zoom lens returns to the first zoom position. Thus, time required for the inter-exposure zoom can be reduced. Moreover, since the image data for the zoom range with exposure loss during the zoom driving in the one direction is obtained during the zoom driving in the opposite direction, the exposure loss does not occur.

Subsequently, a flow of processing of the camera in this embodiment will be described by using a flowchart illustrated in FIG. 8. This flow is started when the release button is operated in a state in which the inter-exposure zoom photographing mode is set.

When the flow is started, first, similarly to Step S1, the zoom driving s started (S31). The timing at this Step S31 corresponds to the time t31 in FIG. 6. At this Step, the driving of the zoom lens 3 is started so that the focal length is changed toward the telephoto side.

When the zoom driving is started, then, exposure of the N-th image is started (S33). The timing at this Step S3 corresponds to the time t32 and the like in FIG. 6. At this Step, the mechanical shutter 4 is opened, the subject image is formed on the image sensor 5, and the exposure operation is started. In the flowchart illustrated in FIG. 4, photographing is described separately for the first image and the N-th image. However, since they are substantially the same except that the relatively bright composition processing is not executed in the first photographing and the like, they are described without discrimination from the first photographing in the flow illustrated in FIG. 8.

When the exposure of the N-th image is started, then, it is determined whether or not the exposure time has elapsed (S35). This exposure time corresponds to time between the times t32 to t33, t34 to t35, t36 to t37 and the like in FIG. 6. The exposure time shall be time when proper exposure is obtained, but it may be set by other setting methods such as manual setting by the photographer other than the above. As the result of this determination, if the exposure time has not elapsed, the elapse is awaited.

When the exposure time has elapsed as the result of the determination at Step S35, the exposure of the N-th image is finished, the image data of the N-th image is read out, the bright composition is performed, and display is performed (S37).

Subsequently, it is determined whether or not it is the zoom position of photographing completed (S39). If the photographer observes the progressive image displayed on the display section 37 and finishes the inter-exposure zoom, the photographer operates the release button again, and the determination is made on the basis of this operation. Moreover, when the driving end of the zoom lens 3 is reached, it is also determined to be the zoom position of photographing completed. As the result of this determination, if it is not the zoom position of photographing completed, the process returns to Step S33, and the inter-exposure zoom photographing is continued.

As the result of the determination at Step S39, in the case of the zoom position of photographing completed, the wide driving is started (S41). This timing corresponds to the time 37 in FIG. 6, and the zoom driving direction is reversed, that is, the zoom driving toward the wide-angle side is started. At start of the wide driving, the number N of the taken images at Steps S33 to S37 is stored in the internal memory 33.

When the wide driving is started, the image is read out to have t1>t2 (S43). Here, as described by using FIG. 6, the exposure (t2) shorter than the exposure time t1 is performed. The image obtained here may be discarded.

Subsequently, the N−1th image is exposed (S45). The timing immediately after the start of the wide driving corresponds to the time t40 in FIG. 6. Here, the mechanical shutter 4 is opened, the subject image is exposed to the image sensor 5, and photoelectric conversion is performed.

When the exposure of the N−1th image is started, then, it is determined whether or not the exposure time has elapsed (S46). This exposure time corresponds to time between the times t40 to t41, t42 to t43 and the like in FIG. 6. The exposure time shall be time when proper exposure is obtained, but it may be set by other setting methods such as manual setting by the photographer other than the above. If the exposure time has not elapsed as the result of this determination, elapse is awaited.

When the exposure time has elapsed as the result of the determination at Step S46, the exposure of the N−1th image is finished, the image data of the N−1th image is read out, the relatively bright composition processing is executed, and display is performed (S47).

Subsequently, it is determined whether N is one or not (S49). Each time the image data is read out at Step S47, one is subtracted from N indicating the number of taken images, and whether N is one or not is determined at this Step. As the result of this determination, if N is not one, the process returns to Step S45, and the inter-exposure zoom photographing is repeated while the zoom driving to the wide-angle side is continued.

As the result of the determination at Step S49, in the case of N=1, since the zoom lens returns to the first zoom position, the flow of the inter-exposure zoom photographing is finished. That is, it is the number of images taken while the zoom driving is preformed to the telephoto side, and since one is subtracted from N at each photographing after reversal of the direction of zoom driving to the wide-angle side, N=1 indicates that the zoom lens has returned to the first zoom position.

Figure 8:
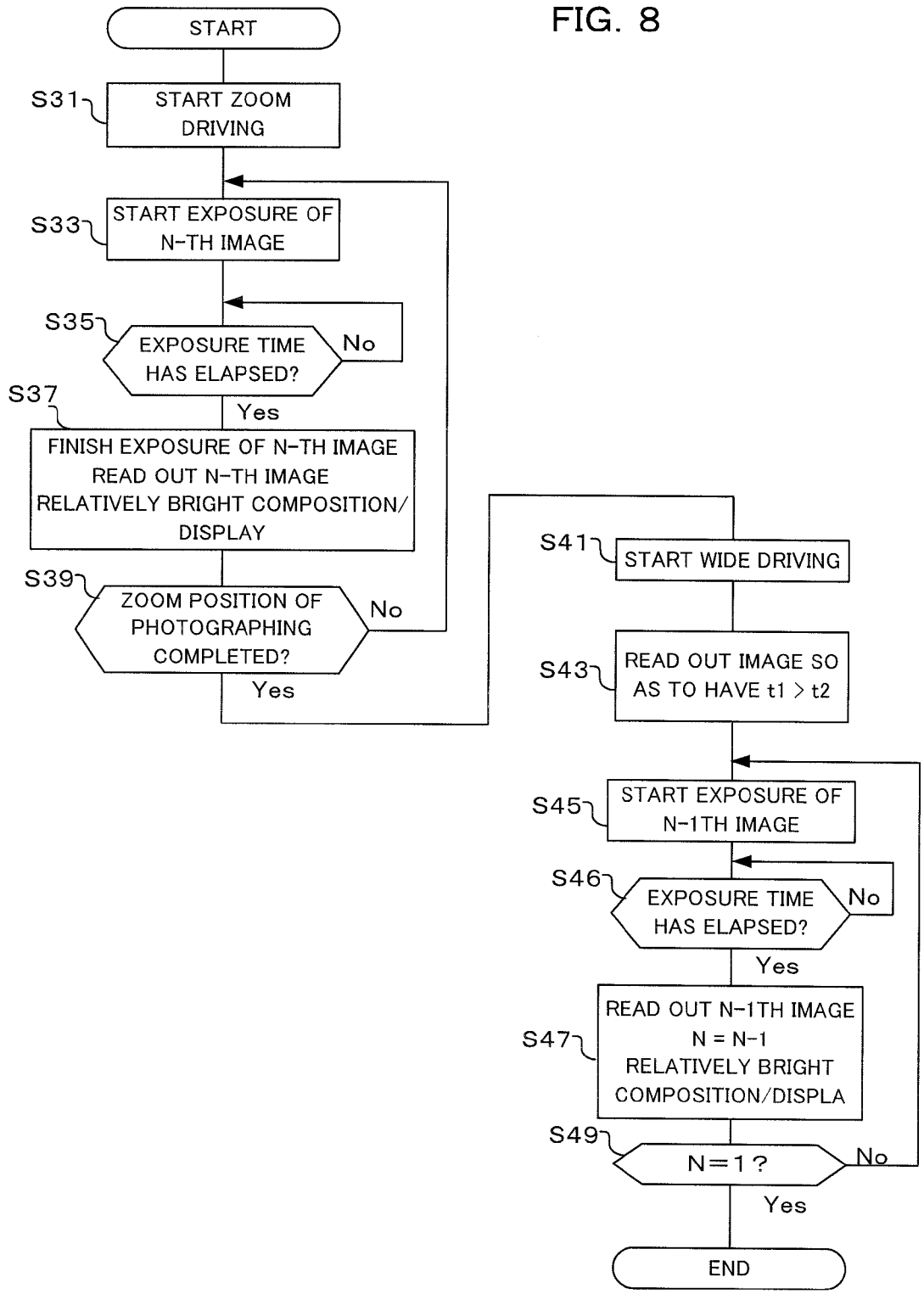
FIG. 8 is a flowchart illustrating an operation of the inter-exposure zoom of the camera according to the second embodiment of the present invention.

As described above, in the second embodiment of the present invention, the plurality of sessions of exposure is repeated (the times t32 to t33, t34 to t35, and t35 to t36 in FIG. 6 and S31 to S39 in FIG. 8) while the zoom driving to the telephoto side is performed, the relatively bright composition processing is executed on the basis of the image data obtained during this period, and the progressive image is displayed on the display section 37 (S37 in FIG. 8).

Moreover, when the zoom position of photographing completed is reached during the zoom driving to the telephoto side, the direction of the zoom driving is reversed to the wide-angle side, and a plurality of sessions of exposure is repeated while the zoom driving is continued (the times t40 to t41, and t42 to t43 in FIG. 6 and S41 to S49 in FIG. 8), the relatively bright composition processing is executed on the basis of the image data obtained during this period, and the progressive image is displayed on the display section 37 (S47 in FIG. 8).

In this embodiment, since the zoom driving to the telephoto side is performed even while the mechanical shutter 4 is closed, the exposure loss occurs between the exposure and the exposure while the mechanical shutter 4 is closed. However, when the zoom driving is performed by reversing the zoom driving direction to the wide-angle side, the mechanical shutter 4 is opened and exposure is performed so as to include at least the zoom range with the exposure loss. Thus, the relatively bright composite image data obtained in the end does not have exposure loss. In this embodiment, the example in which three sessions of photographing are performed to the zoom position of photographing completed is illustrated. However, the three sessions are not limiting but may be larger or smaller than that.

Subsequently, a first variation of the first and second embodiments of the present invention will be described by using FIGS. 9 and 10. In the first and second embodiments, when the photographing is started, the zoom driving is started, and the exposure is also started. At the zoom position of the photographing completed, the zoom driving is stopped, and the exposure is also stopped. However, in this first variation, when the photographing is started, photographing is performed in a stopped state before the zoom driving is started, while at the zoom position of the photographing completed, the photographing is performed in a state in which the zoom driving is stopped. By performing the photographing in the state in which the zoom driving is stopped, the image can be made clearer.

Figure 9:
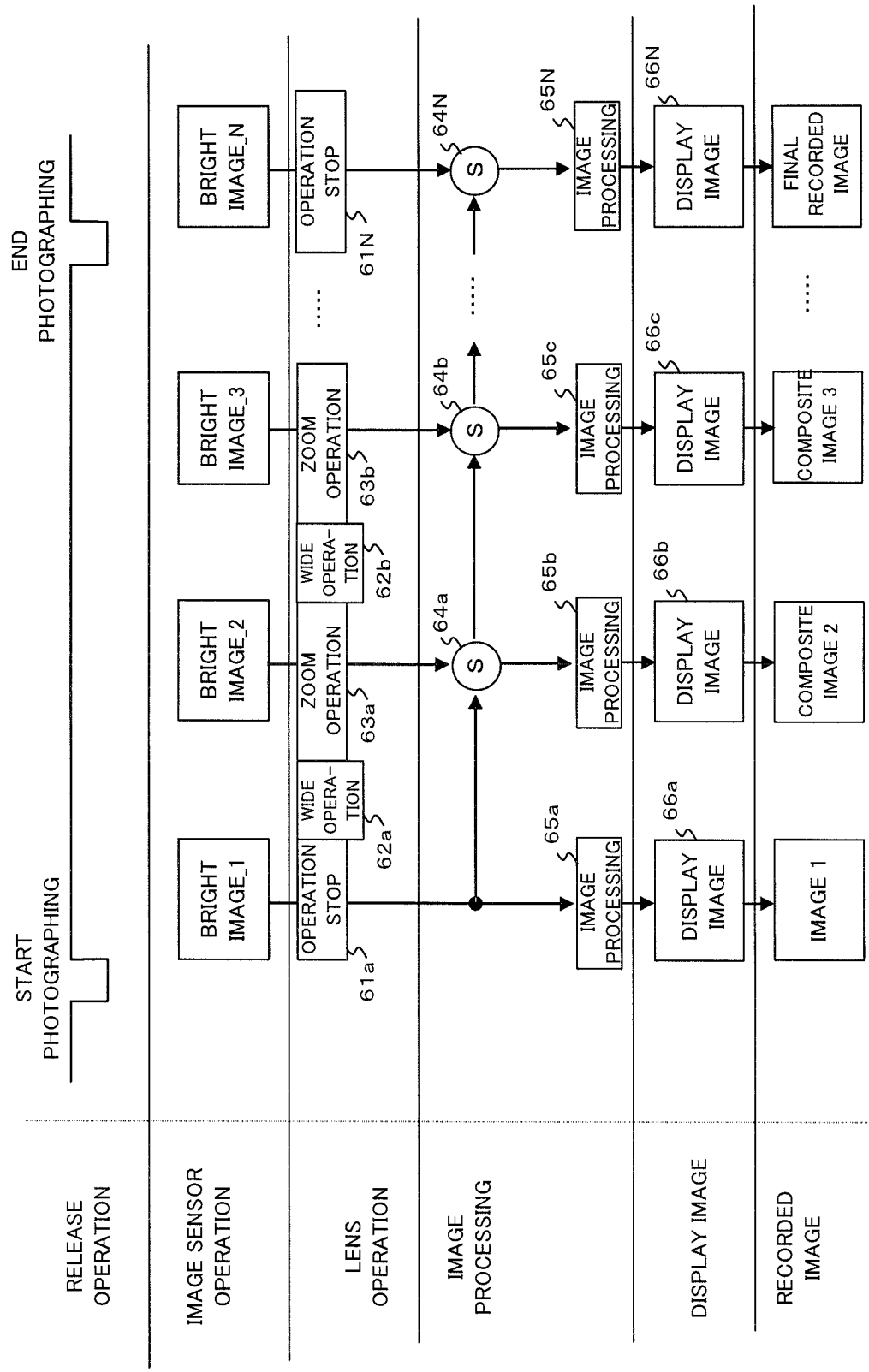
FIG. 9 is a view illustrating image processing in a camera according to a first variation of the first and second embodiments of the present invention.

FIG. 9 illustrates a flow of image processing of this variation. When the photographing is started by the release operation, first, in a state in which the zoom driving is not performed but stopped, the image data of the bright image_1 is obtained. After that, the zoom lens 3 is zoom-driven to the wide-angle side (wide operation 62a), and once the zoom driving start position is returned to the wide-angle side, and then, the zoom driving is performed to the telephoto side (zoom operation 63a). Then, the image data of the bright image_2 is obtained in the zoom-driving state. The image data of the bright image_2 obtained here is subjected to image processing 65b with the image data of the bright image_1 obtained in the stop state, a display image 66b is displayed, and the composite image_2 is recorded. After that, the photographing is repeated similarly to the first embodiment.

At the zoom position of photographing completed, the zoom driving is stopped (operation stop 61N), and in the stop state, the image data of the bright image_N is obtained. The relatively bright composition processing is executed by using the relatively bright image generated by using this bright image_N and the image data of the prior image, a display image 66N is displayed, and a final recorded image is recorded.

Subsequently, an operation of this variation will be described by using a flowchart illustrated in FIG. 10. When entering the flow in FIG. 10, first, exposure of the first image is started, and the zoom position of the first image is recorded (S51). Here, since the zoom driving of the zoom lens is started, in the stop state, the mechanical shutter 4 is opened, the subject image is exposed on the image sensor 5, and photoelectric conversion is performed. Moreover, a zoom of the zoom lens at this time is detected and recorded in the internal memory 33.

Subsequently, it is determined whether or not the exposure time has elapsed (S53). It is determined whether or not the exposure time has elapsed since the exposure of the first image was started. The exposure time shall be time when proper exposure is obtained, but it may be set by other setting methods such as manual setting by the photographer other than the above.

When the predetermined time has elapsed since the exposure of the first image was started, the exposure of the first image is finished (S55). Here, the mechanical shutter 4 is closed, and the image data is read out from the image sensor 5. This read-out image data is temporarily stored in the internal memory 33 and is displayed on the display section 37.

When the exposure of the first image is finished, then, the lens driving is performed to the wide side (S57). The processing here corresponds to the wide operation 62a in FIG. 9. Even if the zoom driving to the telephoto side is started, the speed does not reach the constant speed immediately, and here, similarly to the first embodiment, the zoom position is returned to the wide-angle side once. This returning amount may be an amount to such a degree that the constant speed is reached while moving from the returned position to the first position.

When the lens driving is performed to the wide side, then, the zoom driving is performed (S59). The processing here corresponds to a zoom operation 63a in FIG. 9. From the zoom position once returned, the zoom driving is started toward the telephoto side.

When the zoom driving is started, then, it is determined whether or not the zoom position matches the zoom position of the first image (S61). Here, while the zoom driving is performed to the telephoto side, the zoom position is detected, and it is determined whether or not it matches the zoom position recorded at Step S51. As the result of this determination, if it does not match, the process returns to Step S59, and the zoom position is detected while the zoom driving is performed.

As the result of the determination at Step S61, if the zoom position matches the zoom position of the first image, the exposure of the N-th image is started (S63). Here, the mechanical shutter 4 is opened, the subject image is exposed to the image sensor 5, and photoelectric conversion is performed.

When the exposure of the N-th image is started, then, it is determined whether or not the exposure time has elapsed (S65). Here, similarly to Step S53, elapse of the exposure time is awaited. As the result of the determination at Step S65, if the exposure time has elapsed, the exposure of the N-th image is finished, the zoom operation is stopped, the N-th image is read out and is subjected to the relatively bright composition processing and displayed (S67).

Subsequently, the zoom position is returned (S69). As described at S15 in FIG. 4 of the first embodiment and the like, the zoom position is returned once to the wide-angle side so that the image data is obtained during driving to the telephoto side at the constant speed.

When the zoom position is returned, then, it is determined whether or not it is the zoom position of photographing completed (S71). If the photographer instructs end of the inter-exposure zoom photographing, or if the zoom end is reached, it is determined to be the zoom position of photographing completed.

As the result of the determination at Step S71, if it is not the zoom position of photographing completed, the zoom driving is performed (S73). Here, the zoom driving is performed to the telephoto side. When the zoom speed reaches the constant speed, the process proceeds to Step S63, and the exposure of the N-th image is started. After that, the aforementioned inter-exposure zoom photographing is repeated until the zoom position of photographing completed is reached.

On the other hand, as the result of the determination at Step S71, if it is the zoom position of photographing completed, then, exposure of the last image of the bright images is started (S75). This processing corresponds to the exposure for obtaining the bright image_N in FIG. 9. The zoom driving is stopped, the mechanical shutter 4 is opened, the subject image is exposed to the image sensor 5, and photoelectric conversion is performed.

When the exposure of the last image of the bright images is started, then, similarly to Step S53, it is determined whether or not the exposure time has elapsed (S77). As the result of this determination, if the exposure time has not elapsed, elapse is awaited.

As the result of the determination at Step S75, if the exposure time has elapsed, the last image of the bright images is read out (S79). Since this bright image is photographed in the state in which the zoom lens is stopped, this image is clear. When the image data is read out from the image sensor 5, the relatively bright composition processing is executed by using this image data and the resultant image data is displayed on the display section 37 and also recorded in the external memory 36. Once this processing is executed, the flow of the inter-exposure zoom photographing is finished.

As described above, in this variation, the image data is obtained before and after the zoom driving is started in the state in which the zoom lens is made still (S53, S79), and the relatively bright composition processing is executed by using this image data. Thus, a clear image can be obtained.

In this variation, the example in which this variation is applied to a case where after the driving to the telephoto side as illustrated in the first embodiment, the zoom position is returned to the wide-angle side once is described. However, this is not limiting, and this variation can be also applied to a case where after the image data is obtained during movement to the telephoto side as illustrated in the second embodiment, the image data is obtained while the zoom lens is returned to the first zoom position to the wide-angle side.

Moreover, in this variation, the image data is obtained both at the beginning and at the end while the zoom lens is stopped. However, this is not limiting, and the image data may be obtained only at one of them.

Figure 11:
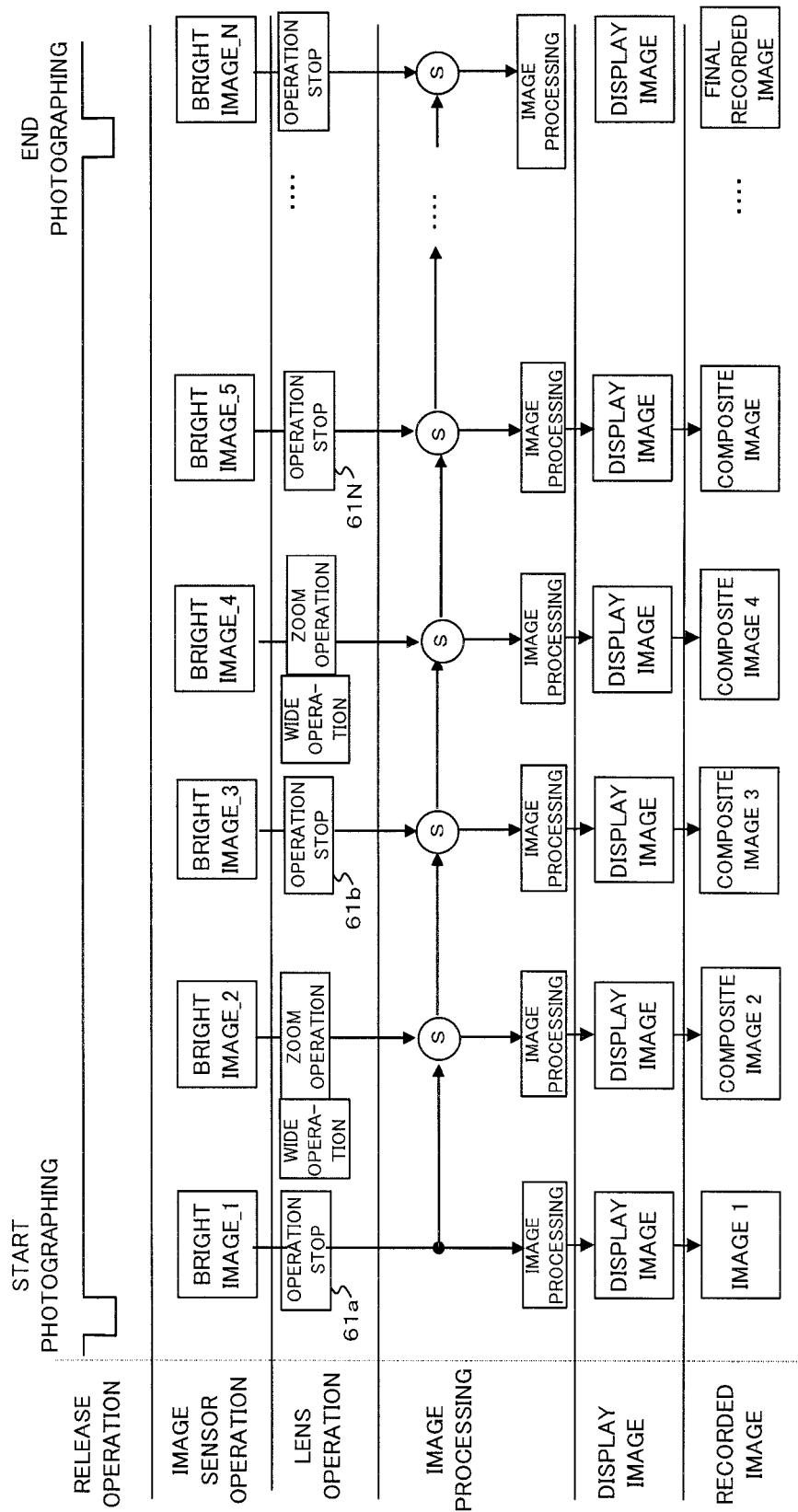
FIG. 11 is a view illustrating the image processing in the camera according to another example of the first variation of the first and second embodiments of the present invention.

Moreover, not limited to the beginning and the end, as illustrated in FIG. 11, the zoom driving may be stopped in the middle of the zoom driving of the inter-exposure zoom photographing. That is, it may be so configured that the operation stop 61*b* is performed in the middle other than the operation stop 61*a* before the start of the zoom driving and the operation stop 61N at the end of the zoom driving, the relatively bright composition processing is executed by using the image data at this time and the resultant image data is displayed and recorded. The number of operation stops in the middle is not limited to one but may be two or more. Moreover, the stop position may be set in advance instead of being instructed by the photographer using the operating member.

Figure 10:
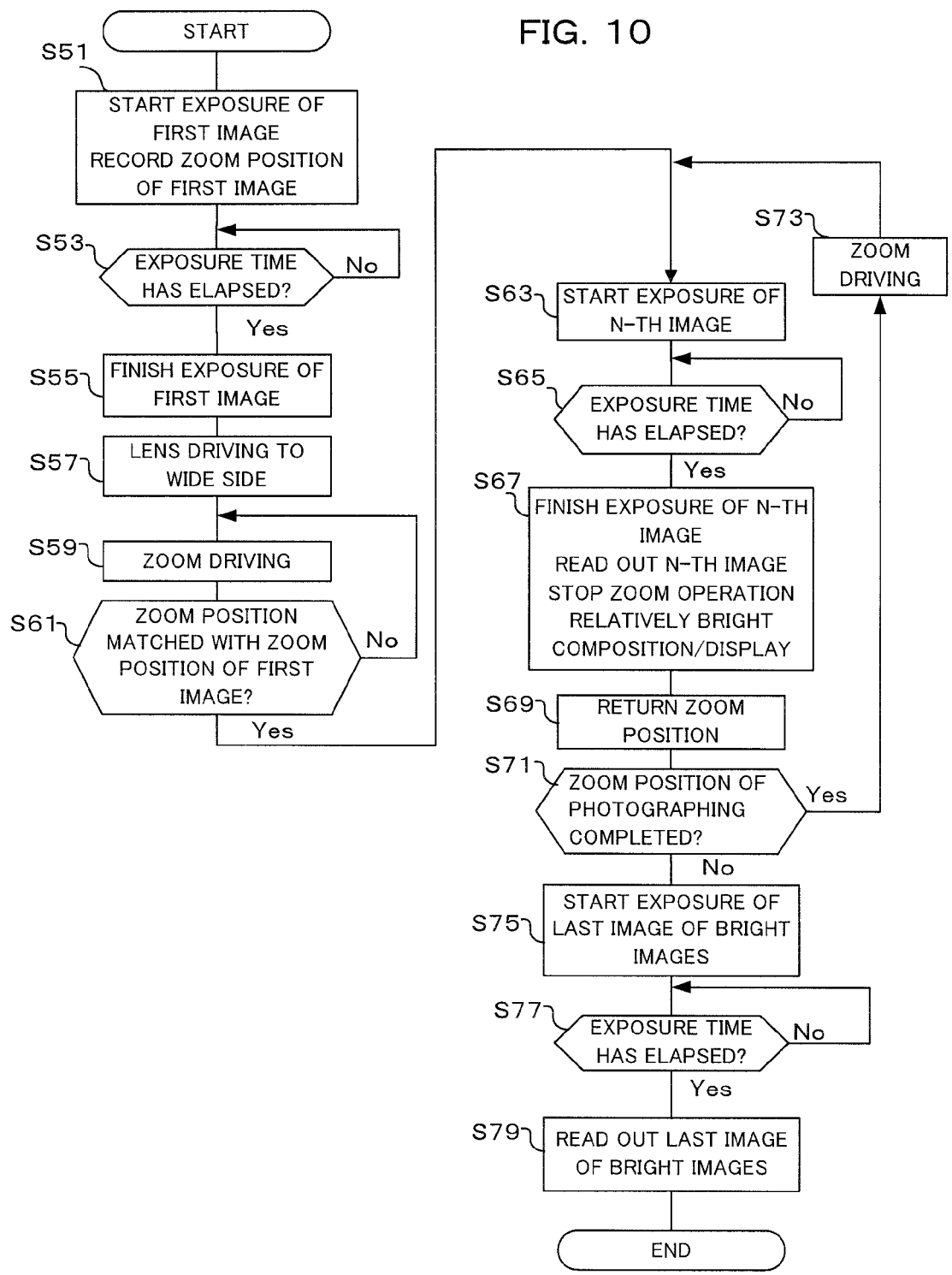
FIG. 10 is a flowchart illustrating an operation of inter-exposure zoom of the camera according to the first variation of the first and second embodiments of the present invention.

FIGS. 9 to 11 illustrate the variation based on the first embodiment but the first variation can be applied also based on the second embodiment.

Subsequently, a second variation of the first and second embodiments of the present invention will be described by using FIGS. 12A to 14. In the first and second embodiments, the description was given that a photographing magnification (image enlargement rate) or a focal length (view angle) of the photographing lens changes uniformly with respect to the driving step of instructing the zoom-lens driving section driving the zoom lens 3. Depending on the type of the photographing lens, the photographing magnification of the photographing lens does not necessarily change uniformly with respect to the driving step of instructing the zoom-lens driving section. Thus, if the zoom driving speed is constant, when a plurality of pieces of the image data is image-combined during the inter-exposure zoom photographing, the brightness of a moving trace of each taken image changes in accordance with the photographing magnification.

In order to make the brightness of the moving trace uniform, there can be a method of changing the zoom driving speed in according with the photographing magnification or view angle. This method cannot be employed if the zoom driving speed cannot be changed. Thus, in the second variation, the exposure time at each photographing or a detection sensitivity of the image sensor 5 (ISO sensitivity) is changed in accordance with a change amount of the photographing magnification during the zoom driving. Thus, in this variation, the brightness of the image data obtained at each photographing during the inter-exposure zoom photographing can be kept constant.

FIG. 12A illustrates an example of a photographing lens whose image enlargement rate changes at each zoom step. FIG. 12B is a graph indicating a relation of the image enlargement rate (zoom magnification) at each zoom step in this photographing lens, and FIG. 12C is a graph indicating a change amount of the image enlargement rate (zoom enlargement rate) at each zoom step.

In the examples illustrated in FIGS. 12B and 12C, the image enlargement rate at zoom steps Zms1 and Zms2 in the vicinity of the wide end (wide-angle side end) is twice, the image enlargement rate is three times at Zms3 and Zms4, and the image enlargement rate is 4 times at Zms5 and Zms6. In this case, in order to keep the brightness level constant regardless of the change in the image enlargement rate by the zoom driving, as described above, it is only necessary that the zoom driving speed is made to be a "change of 1/image enlargement rate". If the image enlargement rate is twice, the zoom driving speed is set to ½ times. However, the zoom driving speed cannot be changed in some cases, and the brightness level is made constant in this variation by changing the photographing condition.

That is, in this variation, if the image enlargement rate is m times, by setting a gain to m times and the exposure time to 1/m, an effect equal to that obtained when the zoom driving speed is substantially set to 1/m times is obtained. For example, if the image enlargement rate is twice, the gain is set to twice and the exposure time to ½. By setting the gain to m times, the brightness level of a moving subject by zoom can be kept constant, and by setting the exposure time to 1/m, a rising portion of the brightness level in a background (a subject without movement by the zoom) due to the gain can be lowered.

Subsequently, an operation of the inter-exposure zoom in this variation will be described by using FIG. 13. FIG. 13 is a timing chart indicating a relation among the zoom driving, a change rate of the enlargement rate (zoom magnification), a shutter operation, a reading-out operation of the image sensor 5, a gain of an image output, and a zoom step when the inter-exposure zoom photographing mode is set.

In the example illustrated in FIG. 13, the zoom driving, the shutter operation, and the reading-out operation of the image sensor are similar to those in the timing chart in FIG. 2 according to the first embodiment. In this variation, the exposure time and the gain of the image output in the shutter operation are made different at each photographing (each exposure). This will be mainly described.

At time t51, when the photographing is started, the zoom driving is performed to the telephoto side. Then, at time t52, the driving speed of the zoom lens 3 becomes a constant speed, the mechanical shutter 4 is opened, the subject image is formed on the image sensor 5, and each pixel of the image sensor 5 performs photoelectric conversion. At this first exposure, the gain application section 13 applies a gain to the image data read out with a gain Sv1 (read out at the times t54 to t55).

At the time t53 after the first exposure time (Tv1) has elapsed since the time t52, the mechanical shutter 4 is closed, and the zoom driving is performed again to the wide-angle side. Since the zoom driving, the shutter driving, the reading-out of the image data and the like during the times t53 to t56 are basically the similar processing to those in the timing chart in FIG. 2, detailed description will be omitted (the same applies to times t57 to t60 which will be described later).

At the time t56, since the driving speed of the zoom driving to the telephoto side reaches the constant speed, similarly to the time t52, the mechanical shutter 4 is opened, the subject image is exposed to the image sensor 5, and photoelectric conversion is performed. At this second exposure, the gain application section 13 applies a gain to the image data read out with a gain Sv2 (read out at the times t58 to t59). At the time t57 when the second exposure time (Tv2) has elapsed since the time t56, the mechanical shutter 4 is closed, and the zoom driving is performed again to the wide-angle side.

At the time t60, since the driving speed of the zoom driving to the telephoto side reaches the constant speed, similarly to the time t52, the mechanical shutter 4 is opened, the subject image is exposed to the image sensor 5, and photoelectric conversion is performed. At this third exposure, the gain application section 13 applies a gain to the image data read out with a gain Sv3. At the time t61 when the third exposure time (Tv3) has elapsed since the time t60, the mechanical shutter 4 is closed, and the zoom driving is performed again to the wide-angle side.

The aforementioned exposure times TV1 to TV3 and the gains Sv1 to Sv3 have values according to corresponding zoom steps, respectively. That is, in the examples in FIGS. 12A to 12C, if the zoom step Zms is Zms2, the exposure time Tv1 is set to ½ of the proper exposure time and the gain is set to twice. Moreover, if the zoom step Zms is Zms4, the exposure time Tv2 is set to ¼ of the proper exposure time and the gain is set to 4 times.

Figure 14:
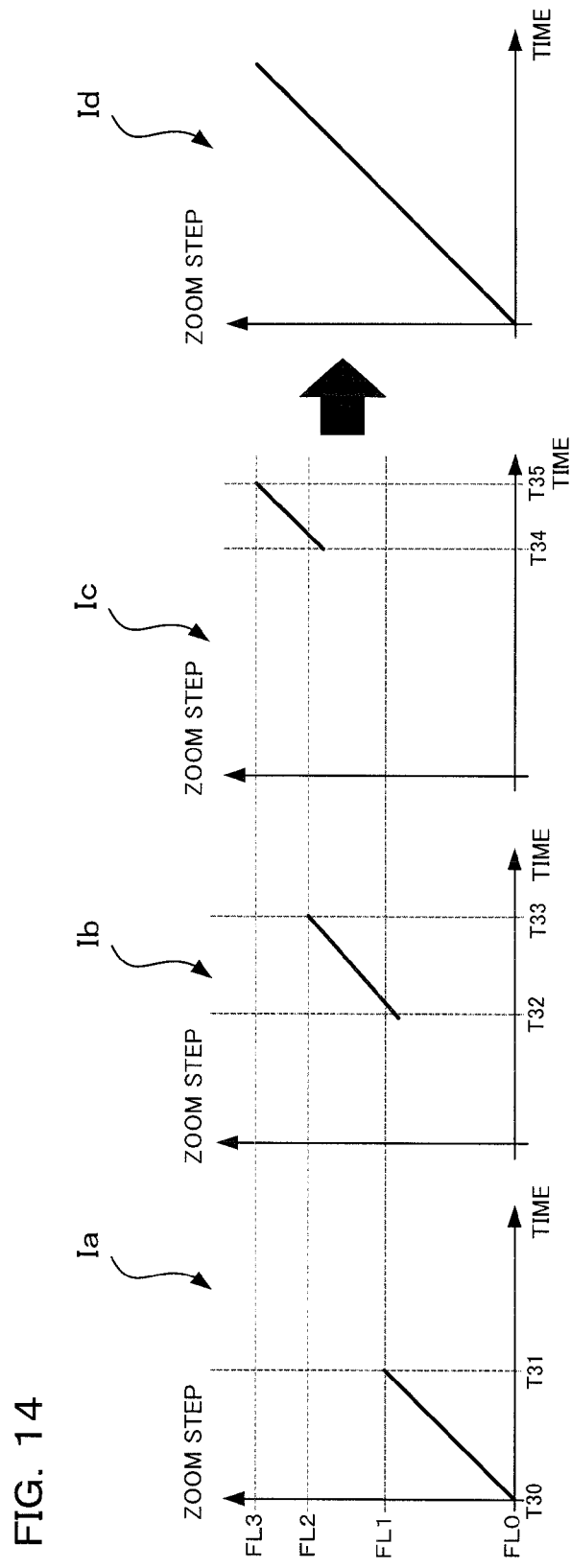
FIG. 14 is a graph illustrating a zoom position at each photographing in the camera according to the second variation of the first and second embodiments of the present invention.

Subsequently, the zoom range in this variation is illustrated in FIG. 14. As illustrated in a graph Ia in FIG. 14, at times T30 to T31, the first exposure is performed (times t52 to t53 in FIG. 13), the image data when the focal length changed from FL0 to FL1 is obtained. Moreover, as illustrated in a graph Ib in FIG. 14, at times T31 to T32, the second exposure is performed (times t56 to t57 in FIG. 13), the image data when the focal length changed from FL1 to FL2 is obtained. Furthermore, as illustrated in a graph Ic in FIG. 14, at times T33 to T34, the third exposure is performed (times t60 to t61 in FIG. 13), the image data when the focal length changed from FL2 to FL3 is obtained.

In FIG. 14, when the first to third exposures are performed, the relatively bright composition section 11 executes the relatively bright composition processing by using the image data obtained in the respective exposures. The image data obtained in this relatively bright composition processing is the image data equal to the inter-exposure zoom photographing image whose focal length is changed in the zoom range with the focal lengths FL0 to FL3 as illustrated in a graph Id in FIG. 14.

As described above, in the second variation of the first and second embodiments of the present invention, during the inter-exposure zoom photographing, the exposure time and the gain at each photographing are changed in accordance with the focal length. Thus, the brightness of the image data obtained at each photographing during the inter-exposure zoom photographing can be maintained constant.

FIGS. 12A to 14 illustrate the variation based on the first embodiment but the second variation can be applied also based on the second embodiment.

As described above, each of the embodiments and the variations of the present invention has the zoom-lens driving section for changing the zoom magnification of the photographing lens and has a function of the inter-exposure zoom photographing for performing the zoom operation during the exposure period. Then, the zoom control step of driving and controlling the zoom-lens driving section for changing the zoom magnification of the photographing lens (see S1 and S9 in FIG. 4, for example), the photographing control step of obtaining a plurality of pieces of image data, respectively, by continuously photographing a subject image during driving by the zoom-lens driving section (see S7 and S15 in FIG. 4, for example), and the image composition processing step of generating the composite image from the plurality of pieces of image data obtained, respectively (S17 in FIG. 4, for example) are provided. Then, the zoom control step and the imaging control step are made to execute control at the same time so that continuous photographing is performed in synchronization with the change of the zoom magnification of the photographing lens in a predetermined direction, zoom driving is operated in a direction opposite to the predetermined direction between the respective photographing in the continuous photographing (S15 in FIG. 4, for example), and the photographing is performed with a part of a zoom position during exposure overlapped. Thus, an exposure loss is not generated in a trace in the composite image.

Moreover, in each of the embodiments and the variations of the preset invention, multi-exposure composition by the relatively bright composition processing is executed in synchronization with automatic change of the photographing view angle through driving and controlling of the zoom lens during the photographing in the inter-exposure zoom photographing. Thus, the inter-exposure zoom photographing can be performed easily.

Moreover, in each of the embodiments and the variations of the present invention, the zoom-lens control is executed so that the exposure loss (discontinuous subject trace in the inter-exposure zoom) is not generated in a waiting time between the exposure and start of the next exposure in the inter-exposure zoom photographing. The waiting time is time based on a time lag required for reading-out of the image data from the image sensor 5, image composition processing and the like.

As the zoom-lens control for preventing the exposure loss, as illustrated in the first embodiment, the zoom operation direction is made opposite to the normal direction in accordance with the shutter (timing of the exposure control) (the zoom-lens control of the telephoto side->wide-angle side is performed as an opposite-direction operation when the normal direction is assumed to be the wide-angle side->telephoto side, for example. See the time t13 in FIG. 2, return of the zoom position at S7 and S15 in FIG. 4 and the like).

Moreover, As the zoom-lens control for preventing the exposure loss, as illustrated in the second embodiment, the zoom operation is performed at an arbitrary speed during the continuous photographing, and the zoom operation at the same speed in the opposite direction is automatically controlled at timing when the photographing timing in the continuous photographing is not overlapped with the zoom driving time (see FIGS. 6 and 8, for example).

Moreover, in each of the embodiments and the variations of the present invention, in the inter-exposure zoom photographing, each exposure time is changed in accordance with the change amount of the zoom enlargement rate by the zoom lens. In the example illustrated in FIG. 13, the enlargement rate of one step is changed by the zoom position, and the exposure time is changed in accordance with this enlargement rate. Thus, even in the case of the photographing lens with the not uniform change of the enlargement rate, uneven density of the traces generated in accordance with the change of the focal length can be prevented.

Figure 4:
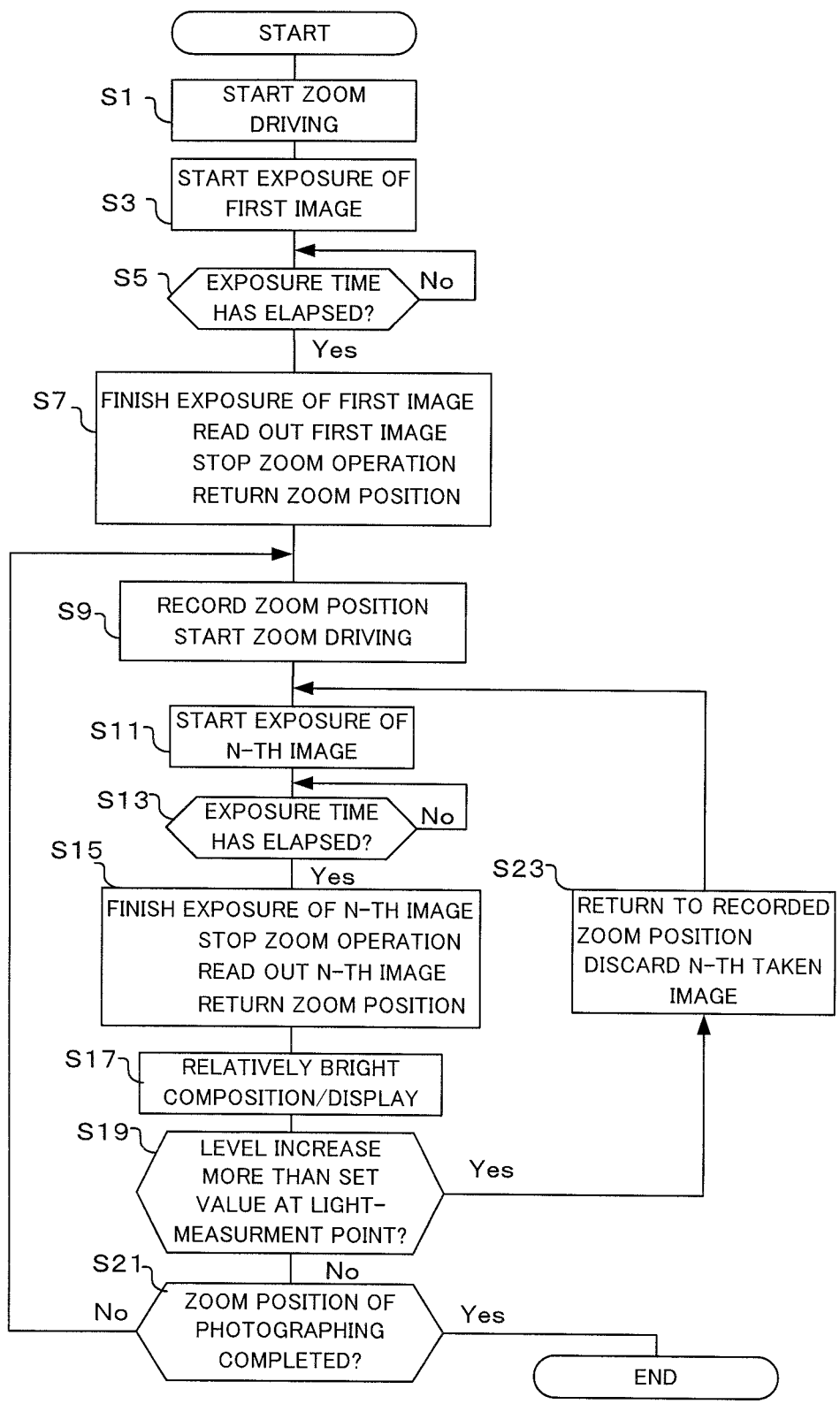
FIG. 4 is a flowchart illustrating an operation of the inter-exposure zoom of the camera according to the first embodiment of the present invention.

Moreover, in each of the embodiments and the variations of the present invention, if there is a brightness input of not less than an arbitrary set value in the inter-exposure zoom photographing (if strong incident light enters), the image data with the brightness input not less than the set value is discarded, and the zoom position is returned to that at the start of photographing of the discarded image, and photographing is performed again (see S19 and S23 in FIG. 4, for example). Here, since the photographing is performed again when the strong incident light enters, it is not necessary to perform the zoom driving which is the very first photographing stage in the inter-exposure zoom photographing again from the stage of obtaining an image by returning the photographing start condition to that of the first image.

Moreover, in each of the embodiments and the variations of the present invention, at the beginning, in the middle or at the end of the inter-exposure zoom photographing, the zoom driving is stopped and the image data is obtained (the operation stop 61a and 61N in FIGS. 9, S51 and S53 in FIG. 10, the operation stop 61a, 61b, and 61N in FIG. 11 and the like, for example). By stopping the zoom driving, an image at a position at the beginning, at the end or the like of the traces of the inter-exposure zoom photographing image can be made clear.

Moreover, in each of the embodiments and the variations of the present invention, the photographer can perform photographing while confirming a length of the trace of the taken image in the inter-exposure zoom photographing by the subject image. Moreover, when a plurality of images is taken and an image is obtained by the relatively bright composition processing, a photographing failure caused by discontinuity of exposure or uneven exposure during photographing of a plurality of images can be prevented.

In each of the embodiments and the variations of the present invention, when the inter-exposure zoom photographing is to be performed, the zoom driving is performed from the telephoto side to the wide-angle side. However, this is not limiting, and the zoom driving may be performed in the opposite direction, that is, from the wide-angle side to the telephoto side.

Moreover, in each of the embodiments and the variations of the present invention, a plurality of pieces of image data obtained by the inter-exposure zoom photographing is subjected to the relatively bright composition processing so as to generate the image data of the composite image. However, not limited to the relatively bright composition processing, other types of image composition processing such as averaging addition processing, simple addition processing and the like may be executed. Moreover, the image composition processing of generating moving images such as time lapse processing may be also executed.

Moreover, in each of the embodiments and the variations of the present invention, a digital camera was used in description as the device for photographing, but as a camera, it is also possible to use a digital single lens reflex camera and a compact digital camera, or a camera for moving images such as a video camera and a movie camera, and further to use a camera that is incorporated into a mobile phone, a smartphone, a personal digital assist (PDA), a personal computer (PC), a tablet-type computer, a game machine or the like. In any case, it is possible to apply the present invention as long as a device is capable of photographing while changing the focal length.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device for performing inter-exposure zoom photographing in which a zoom operation is performed during an exposure period, comprising:
    a photographing lens having a zoom lens;
    a zoom-lens driving section that drives to move the zoom lens, and changes a zoom magnification of the photographing lens;
    an image sensor that continuously photographs a subject image formed on an imaging surface by the photographing lens when the zoom-lens driving section drives the zoom lens and outputting a plurality of pieces of image data, respectively;
    an image processing section that executes image composition processing for generating a composite image from the plurality of pieces of image data obtained, respectively;
    a zoom control section that controls an output of a driving amount to the zoom-lens driving section, and controls a movement of the zoom lens;
    a photographing control section that instructs photographing to the image sensor; and
    an operation control section that causes the zoom control section and the photographing control section to execute control at the same time so that the photographing control section causes the image sensor to perform continuous photographing in synchronization with controlling of the zoom control section by outputting a driving amount for changing the zoom magnification of the photographing lens in a predetermined direction to the zoom-lens driving section, the zoom control section causes the zoom-lens driving section to output the driving amount for operating the zoom driving in a direction opposite to the predetermined direction between the respective photographing in the continuous photographing, and the photographing control section causes the photographing to be performed with a part of a zoom position during exposure overlapped.

2. An imaging device for performing inter-exposure zoom photographing in which a zoom operation is performed during an exposure period, comprising:
    a photographing lens having a zoom lens;
    a zoom-lens driving section that drives to move the zoom lens, and changes a zoom magnification of the photographing lens;
    an image sensor that outputs a plurality of pieces of image data, respectively, by continuously photographing a subject image formed on an imaging surface by the photographing lens when the zoom-lens driving section drives the zoom lens;
    an image processing section that executes image composition processing for generating a composite image from the plurality of pieces of image data obtained, respectively;
    a zoom control section that controls an output of a driving amount to the zoom-lens driving section, and controls a movement of the zoom lens;
    a photographing control section that instructs photographing to the image sensor; and
    an operation control section that causes the zoom control section and the photographing control section to execute control at the same time so that the photographing control section causes the image sensor to perform first continuous photographing in synchronization with controlling of the zoom control section by outputting a driving amount for moving the photographing lens in a first direction at a first zoom speed to the zoom-lens driving section, and the photographing control section causes the image sensor to perform second continuous photographing, which is continuous photographing, in synchronization with controlling of the zoom control section by outputting a driving amount for moving the photographing lens in a second direction opposite to the first direction at the same zoom speed as the first zoom speed after the first continuous photographing is finished, wherein
    the operation control section controls the zoom control section in a zoom range with the zoom magnification of the lens when the second continuous photographing is performed different from that when the first continuous photographing is performed.

3. The imaging device according to claim 1, further comprising:
    a brightness determining section that determines whether or not light with predetermined brightness or more has entered the image data on the basis of brightness data of each of the image data and image data obtained at the first time from the image sensor in continuous photographing, wherein
    the photographing control section discards the image data and causes the image sensor to perform the continuous photographing when the brightness determining section determines that the light with the predetermined brightness or more has entered; and
    the operation control section causes the photographing control section to perform the continuous photographing again after causing the zoom control section to move the zoom-lens driving section again to a zoom magnification position at which the image data was discarded.

4. The imaging device according to claim 1, wherein the image processing section generates composite image data by performing image composition processing including any one of relatively bright composition processing, addition averaging composition, and simple addition on the image data continuously photographed in synchronization with driving of the zoom-lens driving section.

5. The imaging device according to claim 4, wherein the photographing control section changes sensitivity or setting of exposure time when respective images are taken in accordance with a change amount of a zoom enlargement rate controlled by the zoom control section for a photographing condition when the continuous photographing is performed by zoom driving by the zoom-lens driving section.

6. The imaging device according to claim 1, wherein the photographing control section performs photographing in a state in which the zoom driving is stopped at least once of at the beginning, in the middle, and at the end of continuous photographing when the continuous photographing is performed by zoom driving by the zoom-lens driving section.

7. A control method for an imaging device which is an imaging method in the imaging device having a zoom-lens driving section that changes a zoom magnification by moving a zoom lens relative to a photographing lens and performing inter-exposure zoom photographing in which a zoom operation is performed during an exposure period, comprising:

a zoom control step of controlling an output of a driving amount to the zoom-lens driving section for changing the zoom magnification of the photographing lens;

a photographing control step of obtaining a plurality of pieces of image data, respectively, by continuously photographing a subject image during driving by the zoom-lens driving section; and an image composition processing step of generating a composite image from the plurality of pieces of image data obtained, respectively, wherein the zoom control step and the imaging control step are made to execute control at the same time so that continuous photographing is performed in synchronization with the change of the zoom magnification of the photographing lens in a predetermined direction, zoom driving is operated in a direction opposite to the predetermined direction between the respective photographing in the continuous photographing, and the photographing is performed with a part of a zoom position during exposure overlapped.

* * * * *

UNITED STATES PATENT AND TRADEMARK OFFICE
CERTIFICATE OF CORRECTION

PATENT NO.       : 9,654,695 B2
APPLICATION NO.  : 15/098777
DATED            : May 16, 2017
INVENTOR(S)      : Kazuya Hosono It is certified that error appears in the above-identified patent and that said Letters Patent is hereby corrected as shown below:

On the Title Page

In the "Related U.S. Application Data" of bibliographic item (63) please replace:
"Continuation of application No. PCT/JP2015/005039, filed on Mar. 25, 2015." with
--Continuation of application No. PCT/JP2015/059039, filed on Mar. 25, 2015.--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*